United States Patent
Riley et al.

(10) Patent No.: US 10,685,153 B2
(45) Date of Patent: Jun. 16, 2020

(54) BICYCLE SIZER

(71) Applicant: SYSCEND, INC., Irvine, CA (US)

(72) Inventors: Brian Riley, Newport Beach, CA (US); Kyle Jansen, Laguna Beach, CA (US)

(73) Assignee: SYSCEND, INC., Irvine, CA (US)

( * ) Notice: Subject to any disclaimer, the term of this patent is extended or adjusted under 35 U.S.C. 154(b) by 0 days.

(21) Appl. No.: 16/441,663

(22) Filed: Jun. 14, 2019

(65) Prior Publication Data

US 2019/0384874 A1    Dec. 19, 2019

Related U.S. Application Data

(60) Provisional application No. 62/685,576, filed on Jun. 15, 2018.

(51) Int. Cl.
*G06F 30/20* (2020.01)
*G06T 15/00* (2011.01)
*G06T 13/20* (2011.01)

(52) U.S. Cl.
CPC ............ *G06F 30/20* (2020.01); *G06T 13/20* (2013.01); *G06T 15/005* (2013.01); *G06T 2215/16* (2013.01)

(58) Field of Classification Search
CPC ...... G06F 17/5009; G06F 30/20; G06F 30/25; G06F 30/27; G06F 30/28; G06F 2111/00; G06F 2119/22; G06T 13/20; G06T 15/005
USPC .......................................................... 703/6
See application file for complete search history.

(56) References Cited

U.S. PATENT DOCUMENTS

| | | | | |
|---|---|---|---|---|
| 6,152,856 A | * | 11/2000 | Studor | A63B 24/00 482/8 |
| 2007/0010377 A1 | * | 1/2007 | Wu | A63B 69/16 482/61 |
| 2007/0142177 A1 | * | 6/2007 | Simms | A61B 5/1127 482/8 |
| 2008/0026838 A1 | * | 1/2008 | Dunstan | A63F 13/00 463/30 |
| 2008/0246248 A1 | * | 10/2008 | Rabadi | B62K 3/002 280/281.1 |
| 2009/0094138 A1 | | 4/2009 | Sweitzer et al. | |
| 2009/0233769 A1 | * | 9/2009 | Pryor | B60K 35/00 482/8 |
| 2010/0306160 A1 | * | 12/2010 | Simms | G06Q 30/0603 706/52 |
| 2011/0164044 A1 | * | 7/2011 | Huang | A63B 21/0004 345/473 |

(Continued)

FOREIGN PATENT DOCUMENTS

WO    WO 2018/029670 A1    2/2018

OTHER PUBLICATIONS

Jacob Rheuban ("How Bike size works and & how to find the right size for kids' bike", 2017, Prevelo Bikes, 2017, pp. 1-5) (Year: 2017).*

(Continued)

*Primary Examiner* — Iftekhar A Khan
(74) *Attorney, Agent, or Firm* — Knobbe, Martens, Olson & Bear LLP

(57) ABSTRACT

A bicycle sizing system interacts with a user to provide real-time and interactive bicycle sizing information for a rider, such as a child. A growth rate of the child is estimated based on growth models and is usable to estimate a length of time a recommended bicycle will be usable by the child.

13 Claims, 19 Drawing Sheets

(56) References Cited

U.S. PATENT DOCUMENTS

| | | | | |
|---|---|---|---|---|
| 2012/0004956 A1* | 1/2012 | Huston | ............... | H04W 4/80 |
| | | | | 705/14.1 |
| 2012/0323351 A1* | 12/2012 | Chen | ............... | B62K 19/00 |
| | | | | 700/97 |
| 2013/0065733 A1 | 3/2013 | Kautz et al. | | |
| 2013/0332107 A1 | 12/2013 | Hlavacek et al. | | |
| 2015/0119203 A1* | 4/2015 | Kautz | ............... | A61B 90/30 |
| | | | | 482/57 |
| 2016/0144915 A1* | 5/2016 | Bejestan | ............... | B62J 99/00 |
| | | | | 340/432 |
| 2017/0103160 A1* | 4/2017 | Hynes | ............... | G09B 9/058 |

OTHER PUBLICATIONS

He et al. ("Full Bicycle Dynamic Model for Interactive Bicycle Simulator", Journal of Computing and Information Science in Engineering, 2005, pp. 373-380) (Year: 2005).*

Sun et al. ("Design and Construction of a Virtual Bicycle Simulator for Evaluating Bicycle Traffic Control and Facilities Design",2016, EDA publishing, pp. 1-17) (Year: 2016).*

Tang et al. (The Development of a Virtual Cycling Simulator, 2007, Springer-Verlag Berlin Heidelberg, pp. 162-170) (Year: 2007).*

Chen et al. ("Study of Interactive Bike Simulator in Application of Virtual Reality", CSME, 2007, pp. 633-640) (Year: 2007).*

Tang et al. ("The Development of a Virtual Cycling Simulator", Springer-Verlag Berlin Heidelberg 2007, pp. 162-170) (Year: 2007).*

Jacob Rheuban ("How Bike Sizes Work & How to Find the Right Size for a Kid's Bike",Prevelo Bikes, 2017, pp. 1-5) (Year: 2017).*

Chen et al. ("Study of Interactive Bike Simulator in Application of Virtual Reality", Journal of the Chinese Society of Mechanical Engineers, vol. 28, No. 6, pp. 633-640 (2007)) (Year: 2007).*

He at al. ("Full Bicycle Dynamic Model for Interactive Bicycle Simulator", Journal of Computing and Information Science in Engineering, 2005, pp. 373-380) (Year: 2005).*

International Search Report; Application No. PCT/US2019/037241; filed Jun. 14, 2019; dated Oct. 7, 2019; 3 pages.

* cited by examiner

What types of bikes has Fred ridden previously? ← 390

Balance

Pedal

Neither

← 395

Fred tends to ride bikes:

Timidly  Agressively

Show me the bikes!

BICYCLE SIZER

TECHNICAL FIELD

The present disclosure relates to systems and techniques for real-time and interactive determination of bicycle sizing information for a rider.

BACKGROUND

As a bicycle rider grows, sizes of bicycles that are usable, or optimal, for the rider should also change. However, identifying a bicycle that is sized for a particular rider is typically performed through a laborious process of physically "trying out" multiple bike size, brands, styles, etc., at several bicycle retailer locations. Additionally, lack of reasonable estimates of how long a bike will fit a child rider may discourage parents from buying bicycles for their children and may lead to unsafe conditions for children riding improperly fitted bikes. Further, parents may purchase lower quality bicycles for their children due to lack of knowledge of how long a bicycle will last.

SUMMARY

Disclosed herein are systems and methods for, among other features, providing electronic tools that aid a user in selecting the appropriate sized bicycle, without the user ever actually physically seeing or interacting with the bicycle.

Features discussed in further detail below with reference to the figures include:

In one embodiment, a computing system includes: a non-transitory computer readable medium storing software instructions; and one or more computer processors configured to access the software instructions to cause the computing system to: generate interactive user interface data configured for rendering on a user computing device to display an interactive user interface requesting characteristics of a child; receive, from the user computing device via the interactive user interface, characteristics of the child including at least a height and age of the child; execute a rider dimension model to: determine, based on the height of the child, an expected inseam of the child, the expected inseam determined based on a ratio of height to inseam for individuals of the age of the child; determine an avatar of the child sized proportionally to the height and expected inseam; execute a selection model, based at least on the expected inseam, to determine a bicycle size most suitable for the child; select a representation of a bicycle having the determined bicycle size; and update the interactive user interface to include the representation of the bicycle and the avatar of the child positioned sitting on a seat of the bicycle. Other embodiments of this embodiment include corresponding methods and computer programs recorded on one or more computer storage devices, each configured to perform the actions of the methods.

Implementations of the computing system may include one or more of the following features. The computing system where the avatar is a two dimensional or three dimensions representation of the child. The computing system where the representation of the bicycle is a two dimensional or three dimensions representation of the bicycle. The computing system where an output of the sizing model indicates a bike life estimation indicating a period of time for which the child fits the bicycle. The computing system where the sizing model: determines a current age of the child; for each of a plurality of future ages of the child: determines a growth rate of the child, based on the future age, where children of different ages have different growth rates; determines, based on the growth rate of the child, an expected inseam at the future age; determines, based on the expected inseam at the future age, a future bicycle size most suitable for the child; and determines whether the future bicycle size is different than the bicycle size. The computing system further including: if the future bicycle size is different than the bicycle size, determine the bike life as a difference between the future age and the current age of the child. The computing system further including: if the future bicycle size is different than the bicycle size by a predetermined amount, determine the bike life as a difference between the future age and the current age of the child, where the predetermined amount allows the determined bike life to extend into a time period where the future bicycle size would fit the child but the current size would still fit the child comfortably. The computing system where the current age of the child is automatically determined based on the height of the child. The computing system further including: animating the representation of the bicycle to indicate the avatar pedaling the bicycle. The computing system where the three dimensional representation of the bicycle and the avatar are rotatable in at least two dimensions, via input from the interactive user interface. The computing system further including: generating an electronic or printed sizing report indicating, for each of a plurality of future ages of the child, one or more of: the future age; an expected height at the future age; an expected inseam at the future age; a future bicycle frame suitable for the child at the future age; a bike life of the bicycle; and a new bicycle size for the future age. The computing system where the software instructions are further configured to: receive user input indicating adjustments to a future age of the child and in response to changes in the future age, in realtime: determine the expected inseam of the child at the future age; select an updated avatar to represent the child at the future age; and use the updated avatar in place of the avatar on the representation of the bicycle. The computing system where the user interface includes a slider user interface control that allows adjustment of the future age of the child. Implementations of the described techniques may include hardware, a method or process, or computer software on a computer-accessible medium.

In one embodiment, a non-transitory computer readable medium stores software instructions configured to cause a computing system to: generate interactive user interface data configured for rendering on a user computing device to display an interactive user interface requesting characteristics of a child; receive, from the user computing device via the interactive user interface, characteristics of the child including at least a height and age of the child; transmit the characteristics of the child to a sizing computer system; and receiving, from the sizing computer system, a recommend bicycle size and an expected bicycle life indicating a predicted time period of usability of the recommended bicycle by the child. Other embodiments of this embodiment include corresponding methods and computer programs recorded on one or more computer storage devices, each configured to perform the actions of the methods.

Implementations of the computing system may include one or more of the following features. The non-transitory computer readable medium further including: receiving, from the sizing computer system, indications of an avatar of the child sized proportionally to an expected inseam of the child and a representation of a bicycle having the determined bicycle size; and updating the interactive user interface to include the representation of the bicycle and the avatar of the child positioned sitting on a seat of the bicycle. Implementations of the described techniques may include hardware, a method or process, or computer software on a computer-accessible medium.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

DETAILED DESCRIPTION

Figure 1:
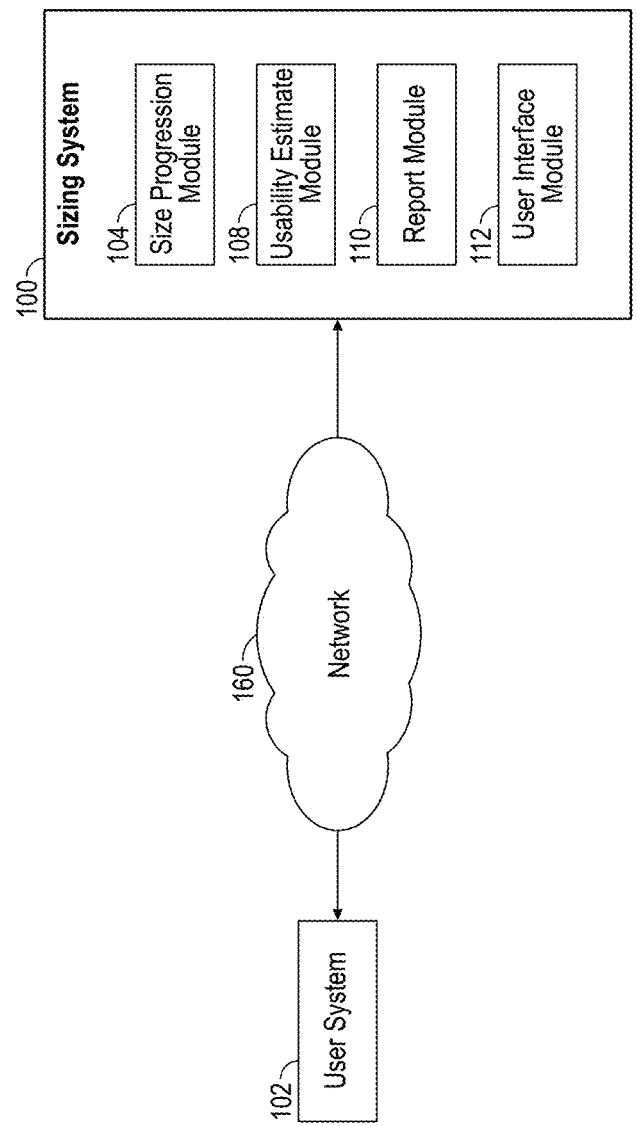
FIG. 1 is a block diagram showing example components of a sizing computing system in communication with a user.

The present disclosure relates to systems and techniques for real-time and interactive determination of bicycle sizing information for a rider. In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

Terms

In order to facilitate an understanding of the systems and methods discussed herein, a number of terms are described below. The terms described below, as well as other terms used herein, should be construed to include the provided descriptions, the ordinary and customary meaning of the terms, and/or any other implied meaning for the respective terms. Thus, the descriptions below do not limit the meaning of these terms, but only provide exemplary descriptions.

Rider: an individual for which a bicycle is being sized. A rider may be an adult or child.

User: an individual, such as a parent user or a child user that operates a computing device that interacts with the sizing system discussed herein, such as on a mobile smart phone or computer device. As discussed herein, a user may interact with the sizing system to identify a bicycle that is sized appropriately for a rider, such as a child. Thus, a user may be a different individual than the rider (e.g., an adult user, such as the parent, grandparent, guardian, or friend of a child), or a user may also be the rider (e.g., an adult user may order a bicycle for the adult rider).

Bicycle size: Any combination of bicycle dimensions, such as frame size, wheel size, handlebar size, and/or any other bicycle dimension.

Body Dimensions: any quantitative or qualitative indicator of an individual's physical structure. Body dimensions may include measurements such as total body height, shoulder height, shoulder width, waist height, waist circumference, inseam height, knee height, shoulder to elbow, elbow to wrist, wingspan, arm length full, and the like. Body dimensions of a user typically represents the user's current body dimensions, while expected (or future) body dimensions represent estimations of one or more body dimensions of the user at some future time. Body dimension measurements are typically taken with shoes on, in a standing position, and with the feet about shoulder width apart. In some implementations, however, the body dimensions measurements may be taken in other manners.

Total Body Height: Distance from top of head to floor when standing.

Shoulder Height: Distance from top of shoulder to floor when standing.

Shoulder Width: Distance between left and right shoulder points. The shoulder points are typically identified as the acrom ion bones, which are at the upper tips of your shoulders. These shoulder points may also be the points where the shoulder meets the arm, or the points at which the shoulder begins curving down into the arm.

Waist Height: Distance from waistline to floor when standing.

Waist Circumference: Distance around waist.

Inseam Height ("inseam"): Distance from crotch to floor when standing.

Knee Height: Distance from knee to floor when standing.

Shoulder to Elbow: Distance from shoulder (e.g., acrom ion bone) to elbow.

Elbow to Wrist: Distance from elbow to wrist.

Wingspan: With arms fully extended and perpendicular to floor, distance from left fingertip to right fingertip.

Arm Length Full: Distance from shoulder to end of finger tips.

Rider Dimensions Models: criteria, rules, instructions, code, models, etc. that provide estimates of body dimensions of a rider based on other body dimensions, age, and/or other characteristics of the user. For example, a rider dimensions model may be configured to output an estimated height of a child based on a provided age of the child. As another example, a rider dimension model may be configured to output an estimated inseam body dimension of a child based on a provided height and/or age of the child.

Automated Body Dimension Determination: in some embodiments, one or more sensors (e.g. camera, infrared, or other sensors) may be used to detect body dimensions of the child, such as height (e.g., total body height, inseam height, waist height, knee height, etc.). In such embodiments, the user may not be required to perform manual measurements, or may not need to perform as many manual measurements. For example, in some embodiments an imaging device of a mobile phone (e.g., a camera) may be used to automatically detect one or more body dimensions of the child that are suitable for use in the sizing models. In some embodiments, a distance determination application on a mobile device (e.g., such as may be built into the operating system of certain mobile devices) may be used to measure certain body dimensions, such as, for example, by instructing the child to place the phone at the top of their knee, waist, or crotch, so that a distance measurement to the ground may be obtained. Accordingly, in these embodiments measurements of the child are timely, accurately, and easily obtained. In some embodiments, automated body dimensions may be determined in a manner similar to those discussed with reference to FIG. 7B. For example, a 3D scanning device or software running on a mobile phone or other device may be used to obtain imaging data of a rider that is usable to calculate body dimensions of the rider. 3D body sensor data may be obtained via a mobile device executing 3D scanning software, specialized hardware for obtaining 3D images, a laser driven 3D scanner, and/or any other hardware and software capable of obtaining body dimensions information of a rider.

In some embodiments, the child may be instructed to stand against a wall, such as a plain colored wall, while another user, such as the guardian of the child, takes a photograph of the child. The photograph may then be processed by imaging software, along with distance information obtained through a distance detection algorithm, to determine various body dimensions of the child, such as height, inseam, and the like.

Future Recommendations: in some embodiments, a sizing system calculates a "bike life" that predict for how long a particular bicycle (e.g., a particular bicycle size) will "fit" a rider (e.g., a prospective operator of a bicycle), such as a child. Advantageously, the computer system and software accesses sizing models that are built on data indicating rates of growth of children at different ages (and/or other body dimensions, such as a height to inseam ratio at various ages) so that future recommendations are particular to the child (e.g., the age, current body dimensions, and expected growth rate over the subsequent months/years). Future recommendations may also include suggestions or recommendations for a next bicycle (e.g., a particular bike size, such as frame and/or wheel size). In some embodiments, the optimal determination of bike life is based on the growth factor (e.g., determined based on age and current height of the child) to determine length of time until max height and/or inseam of the current bike is reached. This provides the users (e.g., parents) with a bike life that is the maximum time the current bike will last (not necessarily when the child will be large enough to fit a larger bike frame, which could be significantly earlier), and use the tool to tell them what bike comes next at the time they have fully outgrown the current bike.

Sizing Models: in some embodiments, the system accesses models that are configured to estimate future body dimensions of a user (e.g., a child). Sizing models may include criteria, rules, instructions, code, models, etc. that provide expected body dimensions of the rider at one or more future times, based at least on expected growth rates of the rider at the one or more future times and one or more current dimensions of the rider. Sizing models may also define relationships between body dimensions and corresponding bicycle dimensions, such as to provide a best fitting bicycle size (e.g., a frame size, wheel size, etc.) for a child of a particular height. For example, a sizing model may indicate that for a particular inseam ranging from A-B inches, a particular bicycle frame of X inches is most appropriate for the user.

Sizing models may be developed based on measurement data of numerous users (e.g., growth data collected on thousands or more children over multiple years of growth) such that the models more accurately predict growth changes at different ages. For example, the sizing models may predict a growth of 2 inches over a next year for a child that is five years old, while predicting a growth of 2.5 inches over the next year for another child that is 12 years old. The sizing models discussed herein can take as input various user body dimensions, such as height, inseam, knee height, waist height, shoulder line height, arm length, and/or other dimensions or user characteristics. Additionally, sizing models may be based on other characteristics of the user, such as a child's experience riding bicycles, the child's riding style (e.g., from timid to aggressive), and/or other factors that may impact fitting a bike to a child.

Sizing User Interfaces: in some embodiments, a 3D representation of the user (e.g., a child that is being sized for a bike by an adult/parent user) that accurately depicts body proportions. Additionally, the user interfaces may provide a 3D visualization of one or more bicycles, such as with the representation of the child (referred to herein as an avatar) positioned on the bicycle in the user interface. Thus, the user interfaces provide accurate estimations and visualizations of how the particular bicycle would fit a particular child. In some embodiments, the 3D visualizations are rotatable by user. In some embodiments, 3D visualizations are animated, such as to show how the child would look when pedaling a particular bicycle.

Bike Selection Model: In some embodiments, the system executes a bike selection model that may search one or more databases (local or remote) indicating available bikes, perhaps with 3D models of bikes, and identifies the best sizes for particular sized riders (e.g., based on application of the sizing models) and displays a customized 3D model of the selected bike or bikes. A bike seller/manufacturer interface (e.g., an API) may allow the system to access such databases to review/access such bike data. This feature may allow the user to compare bicycles of different sizes, brands, purchase options, etc. to help identify a bike that both fits the child and also lasts the longest, rather than being limited to a particular line of bikes with limited sizes and availability. In some embodiments, substantially all bikes on the market (whether new or used) may be searchable via the user interfaces, and displayed using 3D models, as discussed further herein.

Bike Life: a period of time for which a particular user is sized to fit a particular bicycle, such as based on a sizing model. For example, in some embodiments the sizing models may be used to determine a bike life for a particular rider indicating, based on expected body dimensions of the user in the future (e.g., calculated at each of six months, one year, two years, three years, etc. in future) and determination of when the currently selected bike size (e.g., a specific bike frame size and/or wheel size) would no longer be suitable for the user.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

While the description herein refers to sizing of bicycles for riders, the sizing software is not limited to sizing for only bicycles. Rather, the various models, software algorithms, user interfaces, etc. are useable with reference to sizing of riders of any other vehicle, such as scooters, motorcycles, or the like. Further, the various models, software algorithms, user interfaces, etc. may be usable with sizing of other goods, such as those that are dependent on size of a user. For example, clothing of the appropriate size may be determined using similar software models and user interfaces, such as to determine a size that is appropriate for a user immediately, as well as determining a life of the clothing (e.g., how long the clothing will fit the user, based on an expected growth rate of the user), expected next size, brand, type, etc. of clothing that will replace a recommended clothing at some point in the future. Thus, the sizing software discussed herein may provide advantageous features across many industries and products, particularly where size of the user (e.g., children's that are still growing) affects the period of usability of the products.

Description of Figures

FIG. 1 above is a block diagram showing example components of a sizing computing system 100, which may also be referred to as a "sizing system" or simply a "system" herein. In the example of FIG. 1, the sizing system 100 is in communication with a user system 102 via a network 160. The user system 102 may include a mobile device (e.g., cell phone or tablet), a desktop computing device, a kiosk, wearable computer device, etc. While examples discussed herein generally refer to user systems (or user devices) as computing devices that are commonly owned or leased by the user, a user system may include a computing device that is not owned by the user, such as an in-store kiosk, tablet, or other computing device that the user utilizes in the store to interact with the sizing software. The sizing system 100 provides user interfaces to the user system 102 (whether owned by the user or by a third-party, such as a bicycle retailer), receives inputs from the user system 102, and determines and provides corresponding bike sizing information to the user system 102, such as in the form of a sizing report (discussed further below).

In the example of FIG. 1, the sizing system 100 includes a size progression module 104, a usability estimate module 108, a report module 110, and a user interface module 112. Depending on the embodiment, the processes performed by, and the corresponding functionality provided by, various of these modules may be performed by other modules or computing systems. In this example embodiment, the size progression module 104 accesses one or more sizing models to estimate various expected body dimensions of a child over time. The usability estimate module 108 determines, for example, which bike sizes (e.g., bike frames, wheels, etc.) are currently and/or at various points in the future within sizing parameters for the child, such as based on the expected body dimensions provided by the size progression module 104. The report module 110 generates one or more "sizing reports," which may include any electronic and/or printed reports providing growth estimates, usability estimates, bike recommendations, etc. for the rider, such as at the time the user provides the rider's current body dimensions and/or at future times based on the predicted future expected body dimensions. The user interface module 112 provides interactive visualizations to the user, such as three-dimensional representations of a rider (e.g., an avatar of a child) and a bicycle that has been automatically chosen to fit the child's body dimensions.

Certain examples discussed herein are illustrated with reference to implementation on a mobile device, such as a smart phone, tablet, or laptop. Such implementations may be achieved via a standalone application that is installable on the mobile devices, such as may be downloaded from an application store available on the mobile device. In other examples, the user interfaces are displayed in a browser on an electronic device, such as a desktop computer, laptop computer, or mobile device. The features of the inventions discussed herein are not limited to any particular implementation. Thus, components, functionality, and features discussed herein may be provided through the user-facing software, whether a standalone application or browser executable code. Further, some or all of the models discussed herein may be executed partially or fully by the user-facing software, or may be performed by a sizing system in communication with the user device via an internet communication channel. References herein to sizing software may refer to software executed on the user device (e.g., a mobile application or browser-executable code) and/or software executed by the sizing system (e.g., a server that interfaces with multiple users). As noted above, user devices (or user systems) may be user-owned or may be third-party devices, such as those owned by a retailer.

Figure 2A:
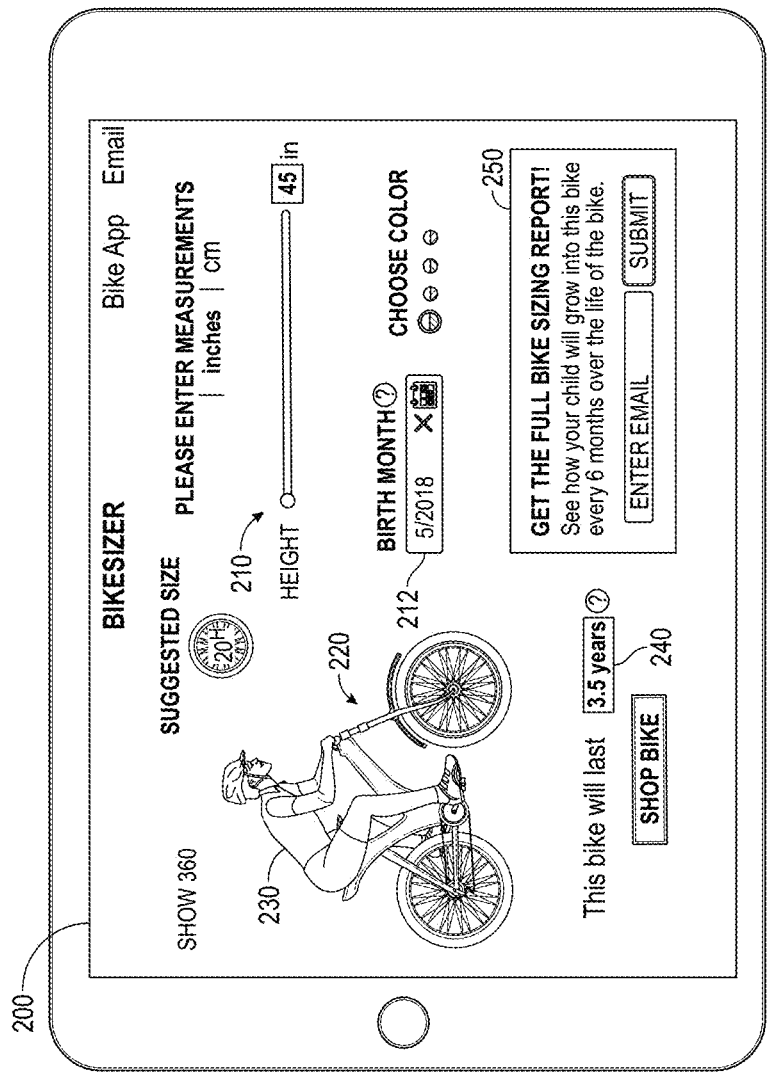
FIG. 2A illustrates an example user interface usable to allow a user (e.g., a parent) to provide body dimensions of a rider (e.g., a child) and view representations of the user on a selected bicycle.

FIG. 2A illustrates an example user interface usable to allow a user (e.g., a parent) to provide body dimensions of a rider (e.g., a child) and view representations of the user on a selected bicycle. In the example of FIG. 2A, the user interface 200 includes a height selection control 210 that allows the user to provide a height of the child. In this example, a slider is provided that can be moved within the range of possible heights (whether in inches, centimeters, or other units of measurement) to indicate the child's current height. In other embodiments, other user interface controls are usable to allow the parent to provide a height of the child, such as a text entry box, a drop-down tool, etc. Additionally, similar user interface controls may be used to allow the user to provide other body dimensions. For example, in some embodiments and inseam dimension is provided via a slider. In some embodiments, a button (or other object) is provided to initial automatic body dimension determinations, such as through use of a camera on a smart device of the user. In some embodiments, other types of user interfaces, such as those illustrated in FIGS. 3E-3F, for example, may be used to obtain rider information.

In some embodiments, automated body dimension determination may be used to simplify determination of body dimensions of the rider. For example, one or more sensors may be used to automatically determine the height of the child. In some embodiments, one or more cameras, distance sensors, and/or 3D sensors, on a mobile device or person tracking devices, such as an Xbox Kinect, may be used to estimate height (and/or other body dimensions) of the child. In some embodiments, inseam of a rider is estimated based on another body dimension of the rider, such as total height or knee height. For example, a rider may measure knee height by placing a mobile device at the top of the rider's knee with the camera pointing to the ground and then selecting a measurement tool in the mobile software (e.g. that may be provided by the provider of the sizing system). The knee height may then be extrapolated to an expected inseam of the rider, such as based on a predetermined relationship between knee height and inseam. Such a predetermined relationship may vary based on the rider's age, height, and/or other characteristics of the rider. For example, knee height to inseam ratio may be 3:4.8 for younger children and 3:5 for early teens.

In the example of FIG. 2A, the computing system automatically selects an appropriate bicycle size (e.g., bicycle frame size and/or wheel size) for the child based on the provided height information. For example, the system may access a sizing model that correlates ranges of heights with corresponding bicycle sizes. In some embodiments, the system executes a rider dimension model to estimate other body dimensions of the child (e.g., based on a user-provided age, height, or other characteristic of the child), which may then be used by the sizing models in selecting the appropriate bicycle frame and/or wheel sizes to display. In some embodiments, other characteristics of the rider may be considered in selecting the appropriate bicycle to display to the user. For example, as discussed further below, experience of the rider, riding style, and the like, may be provided by the user and considered by the usability estimation module in selecting the bicycle or bicycles that would be appropriate for the rider.

In the example of FIG. 2A, a selected bicycle representation 220 is illustrated with a 3D avatar 230 of the child positioned on the bicycle. Advantageously, the avatar 230 includes body proportions that are proportional to the provided and/or estimated body dimensions of the rider. For example, if the parent (e.g., user) provides the height of the child (e.g., rider), the system can execute one or more rider dimension models to determine additional body dimensions of the child, such as inseam, shoulder height, arm length to wrist, arm length full, and/or other body dimensions. In one embodiment, a data structure (e.g., a table, spreadsheet, or database) lists the minimum and maximum seat heights for each available bicycle frame size. In some fitting models, a bike rider should be on their tippy toes 2-3 inches for efficient pedaling. Thus, a child may be matched to a bike that is 2-3 inches less than the minimum seat height of the bicycle, e.g., the child's inseam is 2-3 inches less than the seat height. Thus, looking at inseam to seat height enables selection of bike sizes that are best for each range of children's heights.

In the embodiment of FIG. 2A, a bike life 240 is also provided. As discussed further herein, the bike life indicates an expected time period (or date) for which the illustrated bicycle representation (and corresponding bicycle size) will properly fit the child. In some embodiments, the parent may provide an age of the child, such as via an age input interface 212 (which receives a birth month and year of the child and may then calculate age of the child). In other embodiments, the system automatically determines an expected age of the child, such as based on the provided height of the child. For example, a sizing model may output an expected future height of the child, at each of one or more later times, based on a current height of the child.

The sizing models are advantageously built upon user data (e.g., child ages and body dimensions) such that a growth rate of children at different ages is incorporated into the model. Thus, a child's growth (or any other body dimension, including a ratio of height to inseam) over a particular time period (e.g., a one year period) may not be the same for different age children. Additionally, children that are slower (or faster) growers (e.g., those that don't get a growth spurt until later than average), may have different growth rates at a particular age than other children at that same age. Thus, the calculated bike life 240 (3.5 years in the example of FIG. 2) considers growth rate of the particular child (based on at least height and age of the child) to more accurately estimate expected body dimensions of the child at future times (each six months in the future) and then, based on the expected body dimensions at those future times, determines whether the currently illustrated bicycle visualization 220 is still the best fitting bicycle (e.g., the best bike size for the child at the future age and expected body dimensions). In some embodiments, other factors may be considered in selecting the best fit bicycle for the child, such gender of the child, height of the child's parents, and/or other factors, which may be provided by the user or obtained from one or more third party data sources.

In the embodiment of FIG. 2A, as the parent (or child) changes the height of the child (using slider 210), the rider dimension model and sizing models (which may be a single model in some embodiments or more than two models in other embodiments) are automatically executed to generate updated representations of the avatar 230 and/or the bicycle representation 220. For example, a particular bicycle may be suitable for a child of heights from 45-55 inches, with adjustments to the seat of the bicycle as the user progresses in height. Thus, with the user's height selected (or calculated by the rider dimension model) at 45 inches (using slider 210), the bicycle visualization 220 may show the seat at a lowest level, but as the user adjust the slider 210 to increased heights, the seat level may increase in the bicycle representation 220. Advantageously, as the seat level increases in the bicycle representation 220, the position of the avatar 230 also adjusts to illustrate the user's position on the higher seat. Thus, the parent (or other viewer) can visualize how the bicycle would fit the child as the child's height increases and adjustments to the bicycle seat are made. In some embodiments, additional adjustments for the bicycle at different future ages of the child may also be provided, such as recommended handlebar height. Such adjustments may be communicated to the user by indicating a corresponding height that matches up with indicators on the seat post or steering wheel stem, for example.

Additionally, in the example above where the particular bicycle is suitable until the child's height exceeds 55 inches, as the user slides the height adjustment slider 210 above 55 inches, the bicycle visualization 220 is updated to show a larger bike size, likely with the seat at a lower (or lowest) level. Again, as the updated bicycle visualization 220 with the larger frame size is shown, the position of the child on the bicycle may also be updated so that the user can visualize how the child would fit on the larger bike.

In some embodiments, as the user adjust the child's body dimensions and the avatar and bicycle visualization are dynamically updated, information describing updates to the bicycle configuration or user position and/or regarding potential bicycle fit concerns may be included in the user. Examples of warnings that might be provide, such as based on the determined user dimensions or expected user dimensions in comparison with the displayed bicycle, include items such as "foot not reaching the ground, could cause loss of control," "non-ideal pedaling position," "hand not long enough to reach brake lever," "arms not long enough to comfortably reach handlebars," and the like. The bicycle visualization may include updates such as subtle changes in seat position that are recommended (e.g., at future times based on expected growth of the child), and such changes may also be indicated in pop-up text or via an animation showing the seat adjusting upward as the user interface is updated with the current avatar and bicycle visualization.

Figure 2B:
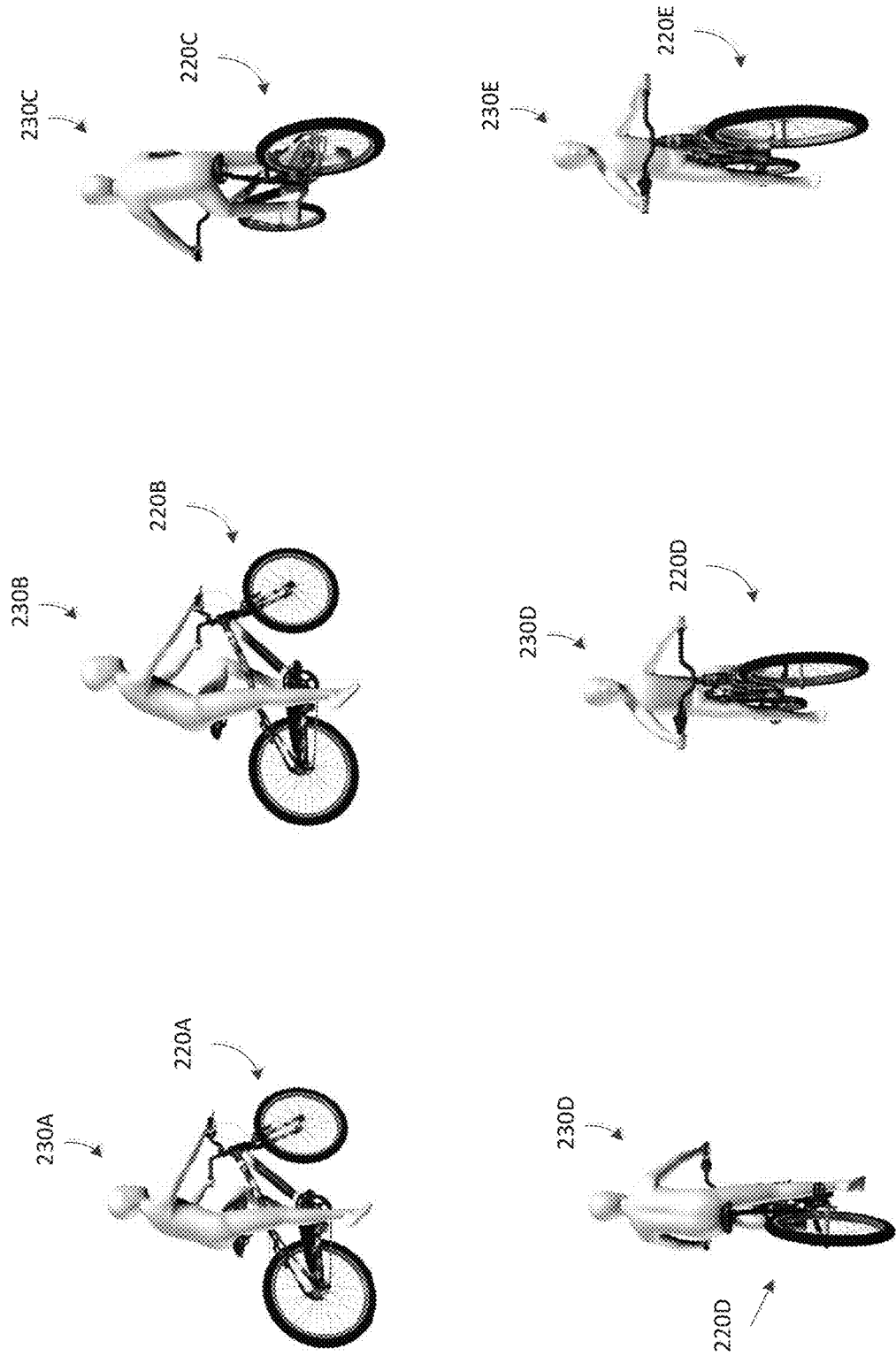
FIG. 2B illustrates several variations of bicycle representations in combination with avatars that may be illustrated in the various user interfaces discussed herein (such as FIG. 2A, 3A, 3B, etc).
Figure 3A:
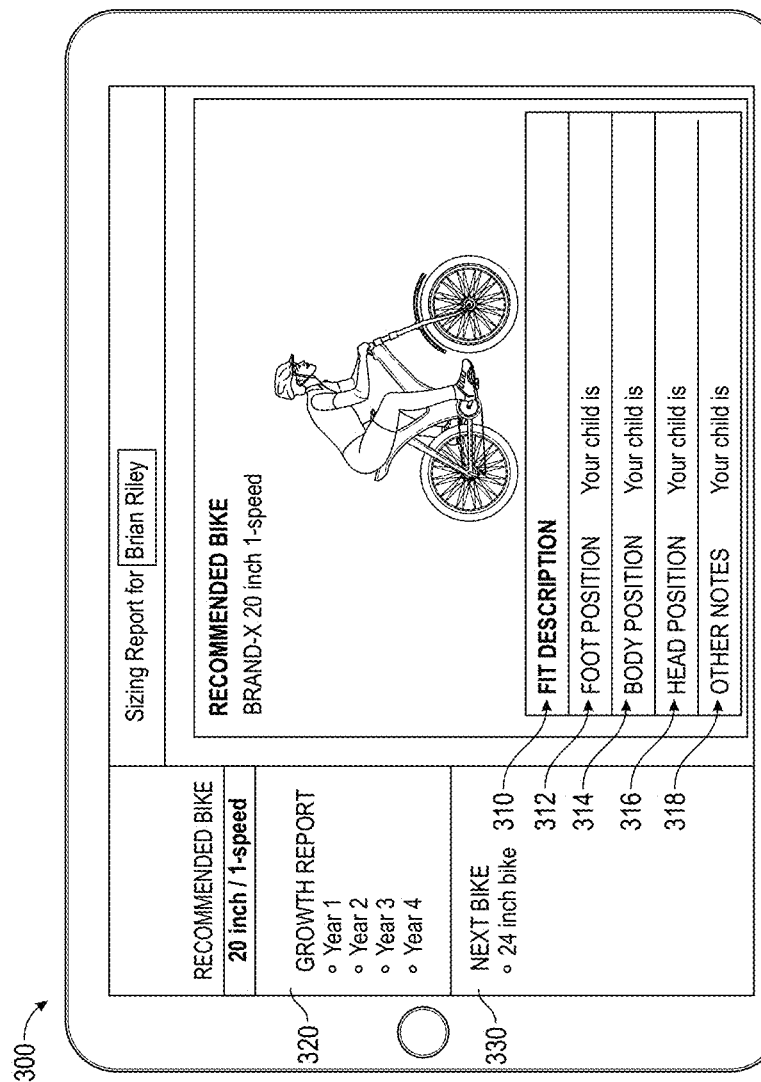
FIGS. 3A and 3B are example portions of a sample sizing report, which may be provided at any time to the user (e.g. the parent), such as when the parent provides the height of the child or may be provided separately to the parent, such as via a later email or printed materials sent via ground mail to the parent.
Figure 3B:
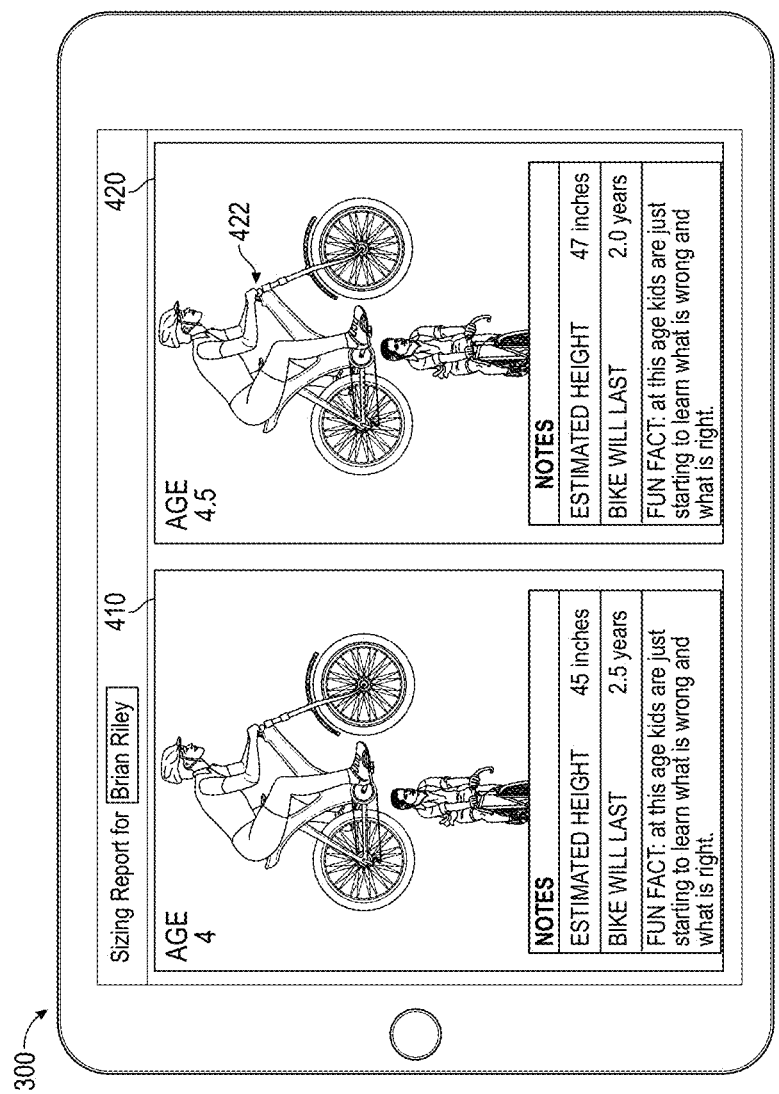

FIG. 2B illustrates several variations of bicycle representations 220A-220E in combination with avatars 230A-E that may be illustrated in the various user interfaces discussed herein (such as FIG. 2A, 3A, 3B, etc). For example, the user may select a "rotation" or "show 360" button of FIG. 2A to initiate an automated rotation of the displayed avatar and bicycle representations from various angles, or to initiate a user-controlled rotation of the avatar and bicycle representations (e.g., via input from a touchscreen or mouse). Depending on the embodiment, the system may store hundreds, thousands, or more, images of various viewing angles of each avatar size and each bicycle representation (together as combined avatar/bicycle images or as separate avatar and bicycle images), such that the rotation features provides an animation-like smooth rotation. In the specific example of FIG. 2B, the bicycle representations 220A-220D represent a first bike size (at different angles of rotation), and the bicycle representation 220E represents a second bike size, such as a larger size that is automatically selected as a next bike size for the child when the future age/size of the child is predicted as fitting a larger bike size.

In some embodiments, the user may create a custom avatar for the rider, such as based on a library of selectable avatar components (e.g., eyes, hair, nose, body type, clothing, jewelry, etc.) and/or use of photographs or video images of the rider. Such a custom avatar may then be shown on the selected bicycle so the virtual representation of the rider on the bicycle more closely resembles the actual rider.

In some embodiments, the sizing software generates an animation that shows the riders growth over time, along with changes to the bicycle components (e.g., seat height, handlebar height, and/or other adjustments) that may be played in the sizing user interface. For example, a 15 second video may show growth of a child from six years old to 16 years old, and highlight changes to the bike components and changes to the overall bicycle multiple times over that 10 year timeframe.

In the example of FIG. 2A, a sizing report request interface 250 is provided, wherein a user can request a report (e.g., an electronic or printed document) providing information regarding expected body dimensions and future recommendations for bikes for the rider. Example sizing reports are provided with reference to FIG. 3. Sizing reports may include other information discussed herein, such as a video, e.g., as discussed above, of the child's expected growth and corresponding adjustments to a bicycle as the child grows older. These videos may include educational material regarding how or why certain bicycle or riding adjustments are being made, e.g., by providing specific safety, health, or comfort reasons for particular recommended adjustments.

FIGS. 3A and 3B are example portions of a sample sizing report, which may be provided at any time to the user (e.g. the parent), such as when the parent provides the height of the child (via the user interface of FIG. 2) or may be provided separately to the parent, such as via a later email or printed materials sent via ground mail to the parent. The sizing report may be provided in various formats, such as interactive HTML, PDF, voice, or other document format.

In the example of FIG. 3A, a representation of the recommended bicycle and the child avatar is provided. Additionally, educational information regarding how the child, at the child's current height, fits the selected bicycle in one or more aspects, is provided in the fit description area 310. In this example, information and/or helpful hints regarding foot position 312, body position 314, head position 316, and other 318 are provided. In other embodiments, fewer or additional recommendation information may be provided in a sizing report. In some embodiments, such information may be provided as overlays on the bike and avatar visualizations, such as in, bubbles that are positioned near the relevant bicycle or avatar portions. As noted above, a video clip may be used to provide a compressed time frame video (e.g., 10 years of expected child growth shortened to a 10 second video clip) illustrating the child's avatar, the bicycle(s) recommended at various ages, recommended adjustments over that time period, and/or other educational materials.

In some embodiments, the sizing report may include one or more growth reports, which generally provide information regarding an expected growth and/or size of the rider at a future time, preferably along with updated information regarding fit of one or more bicycles for that expected size of the rider. In the example of FIG. 3A, the sizing report 300 is interactive, such that the user and/or rider may select one or more growth reports for future time periods to view future recommendations for the child. For example, growth report area 320 includes indicators of four different growth reports for the child, which each illustrate recommended bicycles and related information at different future ages of the child.

In this example, the sizing report 300 also includes a next bike indication 330, which provides a recommendation for a bicycle that is expected to be suitable for the child once they outgrow the current bicycle.

FIG. 3B illustrates another portion of a sizing report 300B, such as a growth report for the child with estimates of expected body dimensions and expected bicycle size (e.g., frame size and/or wheel size) that will be suitable for the child at future times. As shown, this example provides a first growth report 410 with information regarding the child six months in the future and a second growth report 420 with information regarding the child one year in the future. As shown, while the recommended bicycle has not changed for the child when they reach the ages of 4 and 4.5, the seat position and/or handlebar height for the bicycle has adjusted upward in the representation 422 since the child is expected to grow 2 inches over that time. Additionally, the information in growth report 420 has been updated to indicate the estimated height of the child increasing to 47 inches and the additional bike life decreasing to 2.0 years. In some embodiments, additional information, such as the educational information provided in fit description area 310 of FIG. 3A, may be provided for each of the growth reports 410, 420. In some embodiments, the representation of the bicycle and rider may be animated, such as to show the riders avatar peddling the illustrated bicycle.

Figure 3C:
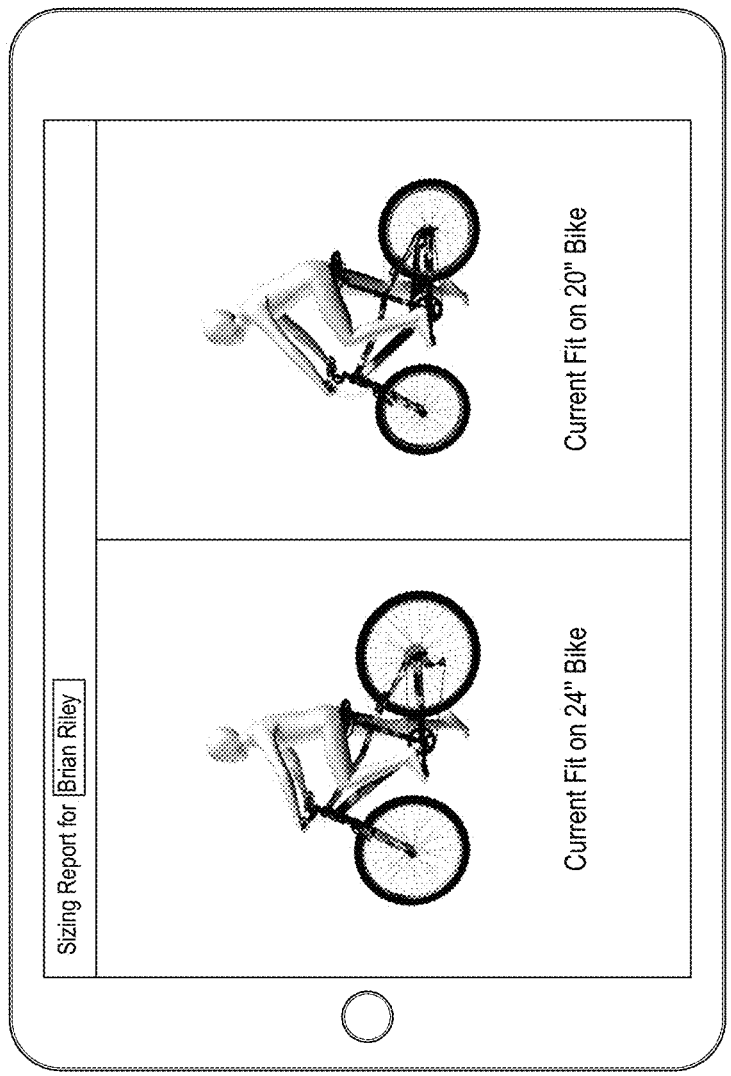
FIG. 3C illustrates another visualization that may be provided as part of a sizing interface.

FIG. 3C illustrates another visualization that may be provided as part of a sizing interface. In this example, the rider's avatar at the rider's current body dimensions is shown on two different sized bicycles in a side-by-side display. For certain ranges of body dimensions, multiple bicycle frame and/or wheel sizes may provide satisfactory fit for the rider. For example, a particular inseam of a rider may match inseam specifications for multiple bike frame sizes or styles. Thus, the system may provide visualizations of how the rider would look on each of the multiple bicycle frame sizes so that the user can better visualize the bicycles and make a better decision as to which frame size is best. In some embodiments, the bicycle and avatar representations are animated, provided in a 3-D rotational view, and/or in an augmented or virtual reality view (such as is discussed further below). In some embodiments, the sizing software may select bicycles for comparison based on additional factors, such as style, color, brand, etc.

Figure 3D:
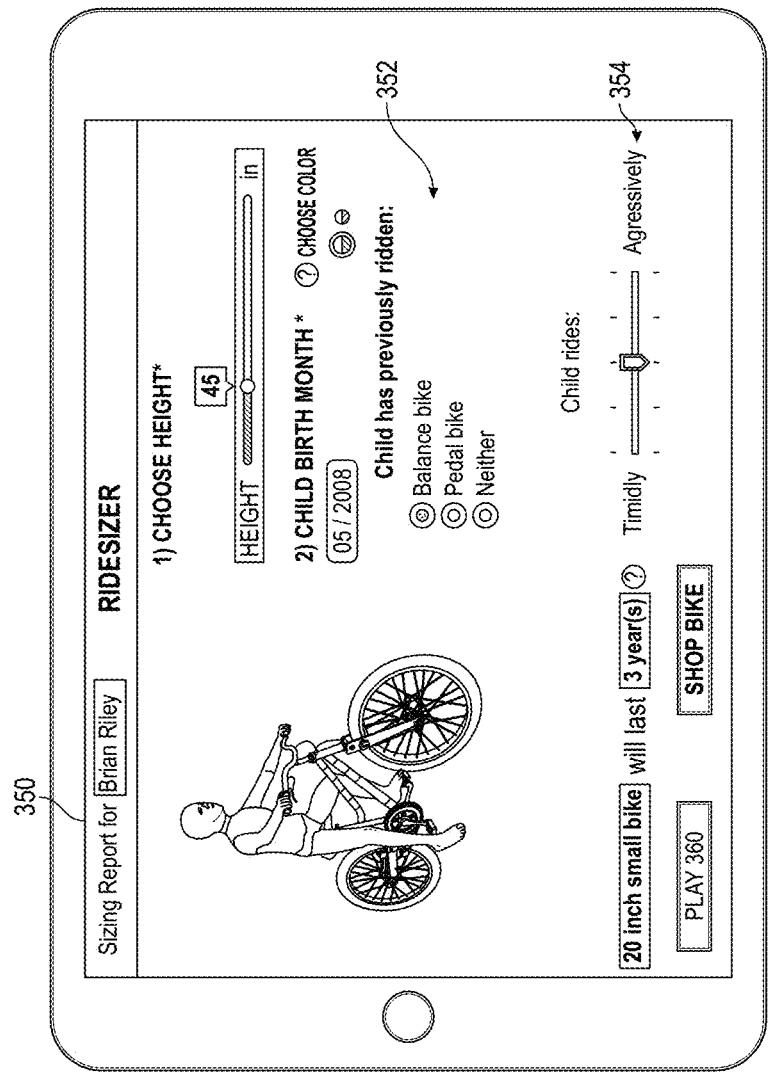
FIG. 3D illustrates another example sizing interface, which includes some additional characteristics of the rider that may be used in selecting the best fit bicycle.

FIG. 3D illustrates another sizing interface 350, which includes some additional characteristics of the rider that may be used in selecting the best fit bicycle. In this example, in addition to providing the option for the user to provide birth month and year for the rider, the user interface 350 further allows the user to select an experience level 352 and/or riding style 354. These additional rider characteristics may be used as inputs to a bike selection model to help identify the most appropriate bicycle for the rider. For example, two riders of the same body dimensions that are suitable for two different bike frames (one being slightly larger than the other, but both being suitable for the particular height) may receive different recommendations of the two bike frames based on experience, riding style, skill or athletic ability, length of intended rides, terrain of intended rides, and/or other factors. For example, a first of the two children that has previously ridden a balance bike and has a moderately aggressive riding style may receive as a recommendation the larger bike frame size, while a second of the two children that has never ridden either a balance or pedal bike may receive as a recommendation the smaller bike frame size. In some embodiments, the riding style interface 354 may be shown and/or activated only when an experience level 352 indicating that the child has ridden either a balance or pedal bike is selected. In some embodiments, further detail regarding writing experience of the child may be requested by the sizing software. For example, if the user indicates that the child has ridden a pedal bike, the system may ask how many pedal bikes the child has ridden, how many hours per week the child rides, and similar follow-up questions. In one embodiment, the experience questions asked of the user are first whether the rider has ridden a balance bicycle and, if so, the user is then asked how many pedal bicycles the rider has ridden (e.g., from zero to 10+).

Figure 3E:
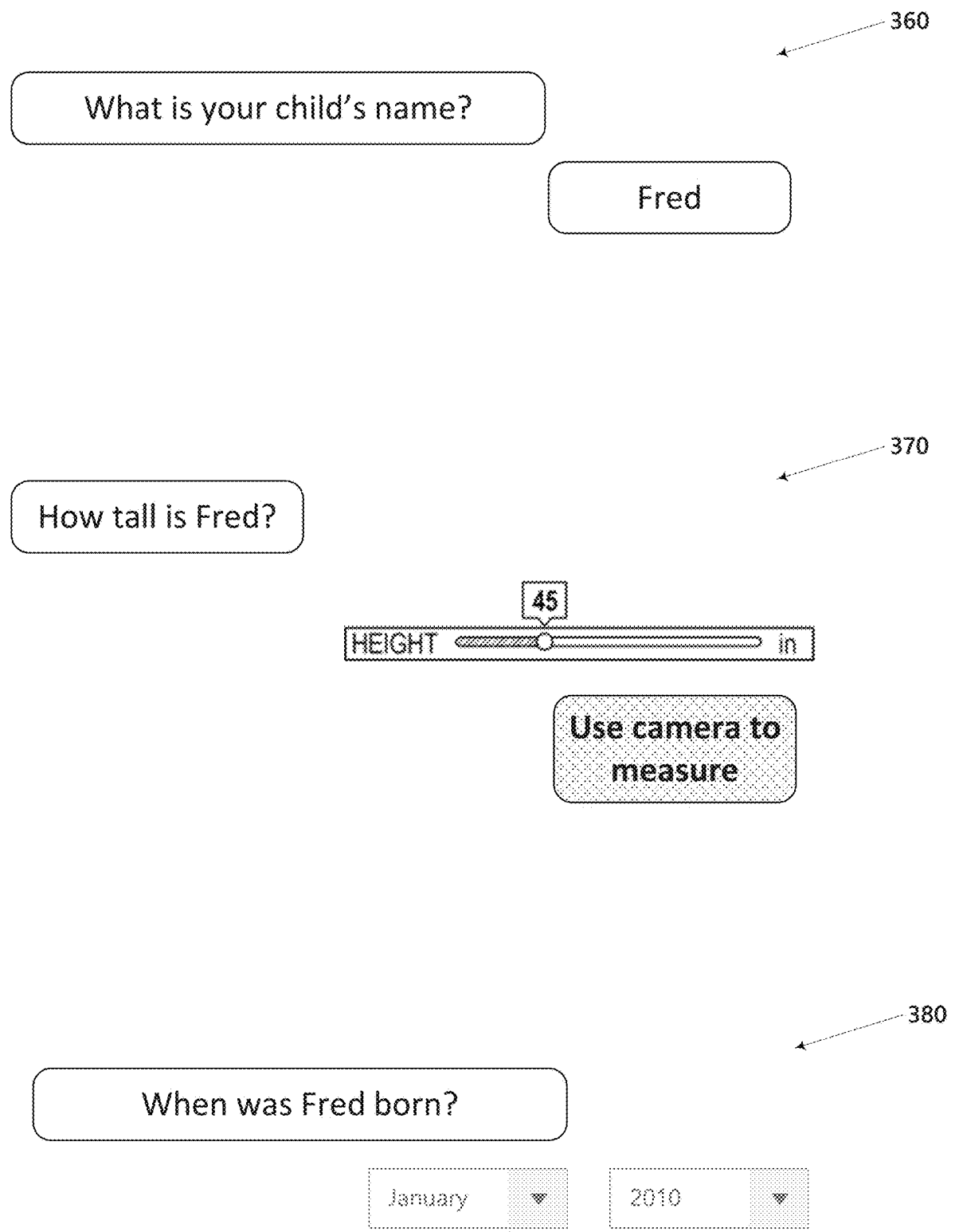
FIGS. 3E and 3F illustrate example user interfaces that may be used to obtain information regarding a rider.
Figure 3F:
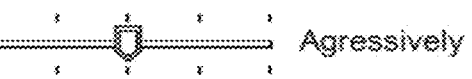

FIGS. 3E and 3F illustrate example user interfaces that may be used to obtain information regarding a rider. In the example shown in these figures, the interactions occur in a conversational format such as with communications from the sizing software anchored on the left side and responses from the user anchored on the right side. This type of data acquisition may be performed via a messaging application, a standalone sizing application, a website, a smart device (e.g., via voice commands) and/or any other online medium. In the example of FIGS. 3E and 3F, multiple dialog interfaces 360, 370, 380, 390, 395 may be presented to the user, such as sequentially. For example, dialogue interface 360 that requests the name of the child may be presented first, and then when the user provides a response (e.g., "Fred"), the next dialogue interface 370 may be presented to the user, such as below the dialogue interface 360 or as a replacement of dialogue interface 360. In one embodiment, multiple or all of the dialogue interfaces 360-395 are illustrated concurrently, and the user may be allowed to provide responses to the dialogue interfaces in any order.

Depending on the embodiment, user interfaces for obtaining rider information may include fewer or additional dialogues than illustrated in FIGS. 3E and 3F. For example, in some embodiments dialogue interface 360 may not be used and, rather, the child is not referred to by name in subsequent dialogues (or the child's name is obtained in another manner). Additionally, the interactivity controls (e.g., the sliders, buttons, drop-down boxes, etc.) may be replaced with other interactivity controls to allow the user to provide the requested information in other manners. For example, in some embodiments the dialogue interfaces may include a microphone activation button that allows the user to provide voice responses to some or all of the questions. In one embodiment, a "conversation" similar to FIGS. 3E and 3F may be accomplished via a standalone voice application (e.g., either on a smart phone or smart device). For example, the sizing software may be triggered with a command such as "what size bike should I buy my child?" In response, the voice-controlled sizing software is executed and conducts a dialogue that may be similar to FIGS. 3E and 3F.

Dialogue interface 360, as noted above, obtains a name of the child. Advantageously, the child's name may then be used to personalize further dialogue interfaces, sizing reports, and/or other information provided to the user. Dialogue interface 370 requests height information of the rider. In this example, a slider is provided to allow the user to select a height of the rider. In another example embodiment, the user is first asked for a height of rider, which may be a required entry to proceed with a bicycle recommendation, and then is asked for an inseam measurement of the rider, which may be an optional entry. In some embodiments, the dialogue may indicate that the bicycle sizing process is improved by some percentage (e.g., 5%-25%) when both height and inseam are provided. Thus, the user may be more motivated to provide both measurements. In other embodiments discussed herein, the sizing software estimates an inseam measurement and/or other body dimensions of the rider based on a provided height measurement.

Additionally, a "use camera to measure" button may be selected to initiate one or more automated body dimensions determinations, such as those discussed elsewhere herein. Dialogue interface 380 request an age of the child, with drop-down controls allowing the user to easily select the month and year of the child's birth. In other embodiments, the user may provide the age of the child. Dialogue interface 390 requests information regarding the child's experience with biking. In this example, the user is provided three buttons that can be selected to indicate that the child has ridden balance bicycles, pedal bicycles, or neither. Dialogue interface 395 then requests information regarding a riding style of the child, with input provided via a slider to indicate timidity or aggressiveness in the child's writing style. In some embodiments, dialogue interface 395 is not displayed to the user if "neither" is selected in dialogue interface 390. Once the user has provided the requested rider information, a "show me the bikes!" button may be selected to initiate display of one or more bicycles sized to the rider, such as in a user interface similar to those in FIG. 3A-3D or 5.

In another embodiment, the rider's experience level is requested with further hierarchal questioning of the user. For example, dialogues 390 and 395 may be replace with alternative dialogues that request additional information from the user. For example, such question may begin by asking the user if they are looking to purchase a first pedal bike for the rider, or a second (or subsequent) pedal bike for the rider. If the user responds that they are looking to buy a first pedal bike for the rider, they are then asked if the rider began on a balance bike. If the rider did begin on a balance bike, the user is asked how confident the rider is on a balance bike, such as using a scale of 1 to 5 to indicate less confident (e.g., one) or very confident (e.g., five). If the user indicates that the rider did not begin on a balance bike or the user does not know if the rider began on a balance bike, the sizing software may ask a more general question about athletic propensities of the rider (e.g., "how athletic is your child"). Responses to the athletic ability question may be provided in various manners, such as on a numerical scale, for example.

In response to the initial question regarding whether the user is looking to purchase a first pedal bike or a second (or subsequent) pedal bike for the rider, if the user indicates that they are looking to purchase a second (or subsequent) pedal bike for the rider, the sizing software may follow up with a question asking whether the rider currently uses training wheels. If the user responds that the rider does not currently use training wheels, the sizing software may further ask how confident the rider is on their current (pedal) bike, such as using a 1 to 5 scale (or other scale) similar to discussed above. If the user indicates that the rider is currently using training wheels or they don't know whether the rider is currently using training wheels, the sizing software may ask a more general question about athletic propensities of the rider (e.g., "how athletic is your child"). Responses to the athletic ability question may be provided in various manners, such as on a numerical scale, for example.

In the example alternative experience level questioning provided above, the sizing software may request additional or less information from the user in different implementations. Additionally, the questions may be provided using any available user interface controls (e.g., text entry fields, auto populated text entry fields, drop-down boxes, menus, radio buttons, sliders, etc.) and/or in a different manner than a dialogue interface, such as illustrated in FIGS. 3E-3F. For example, such questions and answers, as well as all the other interactions with users discussed herein, may be accomplished with other user interfaces, via voice, and/or in any other manner.

Figure 4:
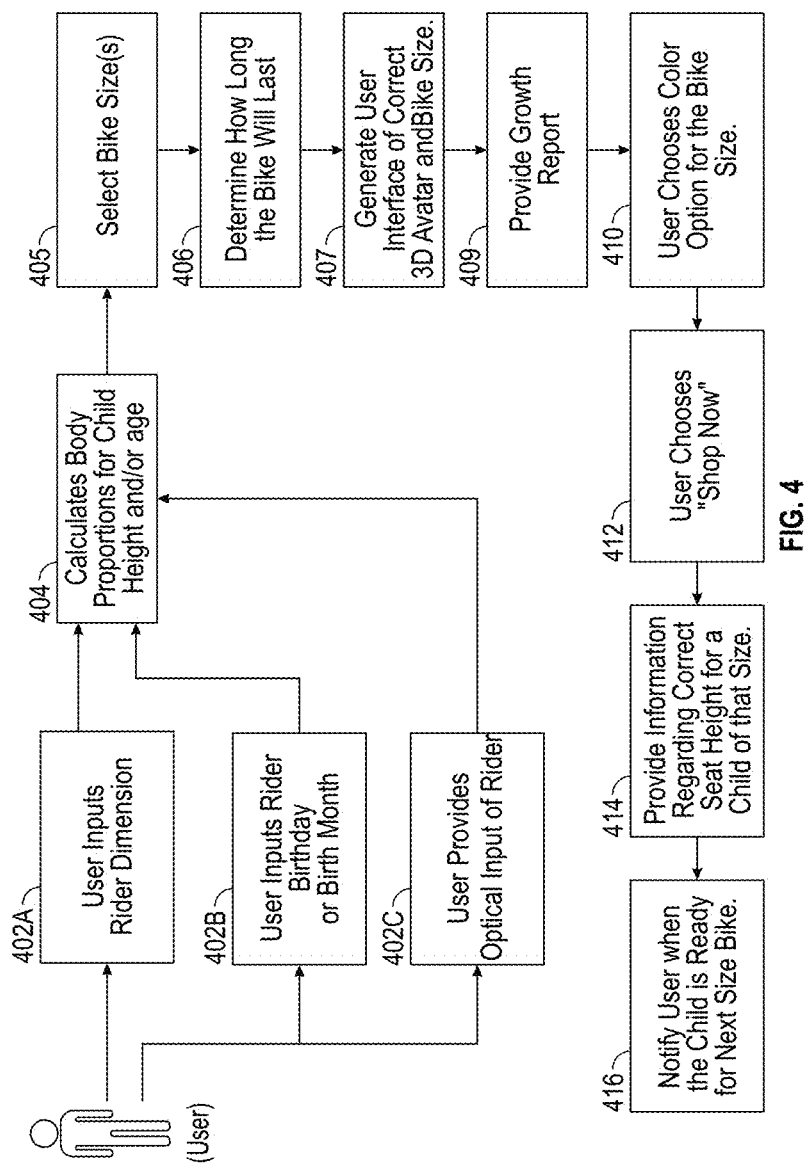
FIG. 4 is a flowchart illustrating one embodiment of a process of providing bicycle sizing information to a user.

FIG. 4 is a flowchart illustrating one example of a process of providing bicycle sizing information to a user. Depending on the embodiment, certain of the blocks may be performed by a user device (e.g., a mobile or desktop device of a parent looking for a bike for a child or an in-store device) and/or by a sizing system (e.g. a server that is accessible via the Internet). Thus, in some embodiments a particular block may be performed by sizing software executing on a mobile device of the user (e.g., in a standalone application or browser-executable code), while another implementation may perform that same functionality on a sizing system server. Depending on the embodiment, the process of FIG. 4 may include blocks that are performed in an order different than illustrated, and/or the process may include fewer or additional blocks.

Beginning in block 402, the user provides one or more body dimensions of the rider for which a bicycle is to be sized, such as a child. In the example of FIG. 4, block 402 includes two possible user input processes, block 402A which receives the child's height and block 402B which receives the child's age (in the form of a birth date of the child or age of the child). In other embodiments, fewer or additional body dimensions of the child may be received. In some embodiments, only a child's height is received (e.g., block 402A), and a rider dimension model, for example, may estimate the user's current age (which may then be used in one or more other rider dimension models and/or sizing models to determine applicable growth rates of the child at respective future times).

In block 402C, the user provides some optical representation of the rider, such as a photograph, video image, optical measurement data, and/or other data derived based on optical inputs. In some embodiments, the user only provides a birthday or age of the user in block 402B, and the rider dimensions are estimated using the optical inputs from block 402C (rather than the user inputting at block 402A). In some embodiments, no personal information of the child is required (e.g. the birthday or height) because the system makes use of automated body dimensions determination using one or more sensory inputs, such as are discussed in further detailed elsewhere herein.

Next, at block 404, the system calculates body proportions based on the child's height and/or other body dimensions. For example, a rider dimension model may be executed to determine one or more of a current estimated inseam, shoulder height, arm length to wrist, arm length full, and/or other body dimensions. In some embodiments, such body dimensions may be provided by the user and/or automatically determined from input received by one or more sensors, such as imaging devices, infrared sensors, motion sensors, etc.

At block 405, the system executes a sizing model to determine a bike size (or multiple bike sizes) for the user, such as based on the provided height of the child at block 404. In some embodiments, the bike size is selected based on an inseam and/or other body dimensions of the child. For example, the user may provide an inseam (at block 402), or the system may execute a rider dimension model to automatically calculate an expected inseam of the child, such as based on a provided height (e.g., total height, knee height, etc.) and/or age of the child. For example, a sizing model may incorporate correlations between children's ages and corresponding inseams to estimate an inseam of a particular child. With the inseam of the child determined, a particular bicycle size may be selected that best fits the child. As noted above, for certain body dimensions, ages, and/or riding experience combinations, multiple bike sizes may be acceptable. In such embodiments, the user may be provided with multiple options along with the pros and cons of each option for consideration in choosing between a smaller and larger bike size.

At block 406, a "bike life", or "how long the bike will last" is calculated. In some embodiments, a sizing model is executed to generate expected body dimensions of the user at one or more future times, based at least on expected growth rates of the user at the one or more future times. In some examples, the growth rate of the user is different at different ages. Thus, sizing models do not simply assume a constant growth rate for a child at each age (e.g., a growth rate of x inches per month at age 3, four, five, six, etc.), but instead identifies growth rate for the child at the specific age (growth rate of x inches per month at age 3, growth rate of y inches per month at age 4, a growth rate of z inches per month at age 5, etc.), such that the expected body dimensions of the child at future times are more accurate, and the estimated bike life is also more accurate. Additionally, sizing models may consider a current height of the child in choosing the expected growth rate for the child. For example, a child that is much taller than is expected for the child's age may be associated with a slower growth rate for the coming years because of an expected slowdown in growth. Additional factors, such as the child's gender, height of parent's, etc. may be used by sizing models to more accurately predict future height of the child.

Moving to block 407, the system generates an interactive user interface including an illustration of a 3D avatar of the child and a bicycle that is selected to fit the child's determined body dimensions. Advantageously, the avatar of the child includes body proportions that are adjusted to match the child's body dimensions (whether provided by the user in block 402 or estimated by the system in block 404) so that a viewer may visualize how the child would actually fit on the selected bicycle.

In some embodiments, the avatar and bicycle representations may be rotatable by the viewer, such as in two or three dimensions. Thus, the user can view the avatar and bicycle representations at countless angles, zoom levels, etc. to obtain a better understanding of how the child fits with the selected bicycle. In some embodiments, the avatar and bicycle representations may be animated, showing the avatar pedaling the bicycle. In some embodiments, educational information may be provided via the user interface and/or voice output, such as when a viewer hovers a cursor over (or selects with touch input) a foot of the avatar, information regarding proper positioning of the child's foot with reference to the pedal and/or ground may be provided, such as in a pop-up text box or voice information, and educational animation of the foot with reference to the pedal or the ground, etc. In some embodiments, the educational information is particular to the type of riding that the rider is interested in performing, such as a riding aggressiveness, terrain, riding time, etc.

At block 409, the system optionally provides a growth report via the user interface (or separately via email or other communication medium). In some embodiments, the user is provided with the option to request a growth report (which may be part of a bike sizing report), such as in the request interface 250 of FIG. 2, while in other embodiments the interactive user interface may be automatically updated to include the growth report or a link to access the growth report. As discussed above with reference to FIGS. 3A and 3B, the growth report(s) advantageously include calculated expected body dimensions of the child at one or more future times so that adjustments to the bicycle (e.g., seat height, steering wheel height, etc.) may be provided to the parent, as well as a recommendation for when the child will likely outgrow the bicycle.

In some embodiments, the system sends periodic updates to the parent, such as via electronic communications, to provide updated educational information regarding proper use of the bicycle. For example, if the system calculates expected body dimensions for the child at six month increments, the system could send an electronic communication to the parent every six months indicating which adjustments to the bicycle and/or riding style of the child, if any, might be appropriate for the child's expected body dimensions at the time. For example, adjustments to the seat height, handlebar height, and/or other aspects of the bicycle, may be recommended in such a periodic communication.

In some embodiments, the user may provide body dimension information back to the system, such as an actual measured height of the child, which could be used by the system to update its sizing models, including growth rates of children at different ages. For example, in some embodiments, rider dimension models and/or sizing models are periodically updated as additional body dimension information is provided back to the system. In some embodiments, machine learning techniques (e.g. such as those discussed below) are applied to available body dimension data and prior recommendations (e.g., bike life estimates), for example, to update the algorithms for models used in determining those estimations. In this way, the accuracy of such estimates may improve over time. In some embodiments, users are provided some incentive for providing body dimension information to the system. For example, a user that has previously purchased a bicycle through the sizing system may be offered a discount of a particular percentage or dollar amount for providing updated body dimensions of the rider that may be used to update and/or optimize the sizing models.

Moving to block 410, the user is provided with options to choose various additional bike characteristics, such as colors, speeds, models, brands, accessories, and the like for the selected bicycle. Different bicycles may have different colors and options or accessories. The user interface customizes the available colors, options, accessories based on those available for the particular bike. In some embodiments, the accessories include a helmet. For example, an appropriate helmet size for the child may be determined based on one or more body dimensions of the child, such as is discussed below. For example, a rider dimensions model may estimate a head size of the child based on age, height, inseam, and/or other body dimensions of the child. Thus, the system may also provide sizing of a helmet for the child that is more likely to fit and provide adequate cranial protection to the child. In some embodiments, as the users body dimensions are adjusted (e.g. using the slider 210 of FIG. 2), head size of the child is dynamically calculated and changes to the best fit helmet size is also indicated in the avatar and/or other graphic or textual information.

At block 412, the user decides to purchase the selected bicycle, with the selected color and/or options (e.g., block 410). Thus, the user may be taken to a shopping cart interface that includes the bicycle in the shopping cart and allows the user to complete the purchase. As noted above, the inventory of bicycles available to the user may vary from implementation to implementation. For example, in some implementations, a sizing system may have access to bicycle inventory across multiple bicycle manufacturers that are available in multiple countries. Similarly, the sizing system may have access to a database of three-dimensional bike models of various bicycle sizes and options from multiple bicycle manufacturers or retailers. In some embodiments, popular bicycle dimensions and/or options may be analyzed to develop a default 3D bicycle model that includes the most popular bicycle characteristics. Thus, the 3D bicycle model may be dynamically updated as trends in styles of bicycles change over time.

In one embodiment, 3D bicycle models may be generated dynamically based on characteristics of bicycle(s) that are selected for display. For example, rather than storing 3D bicycle models of every bicycle, such as multiple models and configuration options from each of multiple manufacturers, which would require a large amount of storage space, the sizing system may dynamically generate a 3D bicycle model for any bicycle based on a set of key bicycle characteristics for the particular bicycle, such as top tube length, down tube length, handlebar height, seat tube length, and/or wheel size. Thus, rather than storing a large 3D graphical file for each possible bicycle configuration, the system may dynamically generate the 3D graphical file based on just a few measurements that may be stored as text or data items in a database. In one embodiment, a standard 3D bicycle model may be dynamically updated to have characteristics of a particular bicycle, such as a bicycle that a sizing model has chosen as the best fit for the child or a bicycle the user has selected. Once a particular bicycle is selected for display, the bicycle characteristics (e.g., top tube length, down tube length, handlebar height, seat tube lengths, and/or wheel size) may be accessed in a database (e.g., that stores those characteristics for thousand or more different bicycles) and used to update the standard 3D bicycle model according to those bicycle characteristics. A custom 3D model of the particular bicycle is produced and can be displayed in a graphical user interface.

In some embodiments, third-party bicycle manufacturers pay the provider of the sizing system a fee for selling one of its bicycles, and/or a fee for referring a user to a purchasing site of the manufacture (e.g., after the user has sized the rider and selected a particular bicycle of the manufacturer for potential purchase). In other embodiments, other variations of compensation schemes may be implemented.

At block 414, the system provides the user with educational information regarding proper use of the bicycle, such as information similar to that provided in the fit description area 310 of FIG. 3A.

Next, at block 416, the system determines when the child is likely ready for a new bicycle, such as based on the bike life calculated at block 408, and just prior to the end of the bike life, notifies the user that the child may be ready for a larger size bicycle in the near future. For example, such notification may be sent via email to the parent a certain time period (e.g., one month, two months, six months) prior to (or after) the expected bike life has been reached.

In some embodiments, special events, such as holidays or birthdays of the child, may be used as triggers for sending notifications to the parent. For example, if a child's birthday is coming in the next three months and the bike life expires in five months, the system may send a notification to the parent so that the parent has the option to purchase a larger bicycle size for the child's birthday (even though the current bicycle may properly fit the child for two months after the child's birthday).

Figure 5:
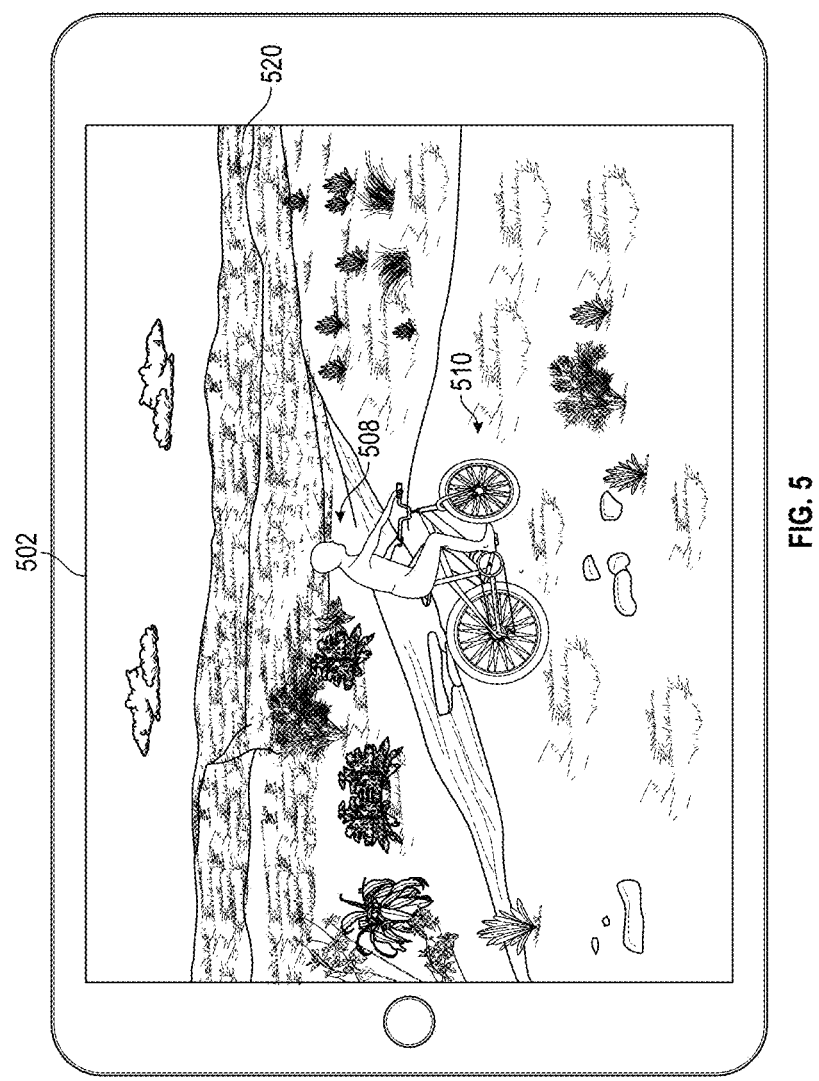
FIG. 5 is an example user interface illustrating an augmented reality view of a rider on a bicycle

FIG. 5 is an example user interface 502 illustrating an augmented reality view of a rider's avatar 508 on a bicycle 510. In this example, the avatar 508 and bicycle 510, which may have been automatically selected by bike selection models discussed above, are shown as they might look when the bike is traveling across an outdoor area 520. In this augmented reality example, a camera of the mobile device is pointed towards the outdoor area 520, which is shown on the display of mobile device, along with a representation of the rider as avatar 508 and a representation of the selected bicycle 510 overlaid on the background. Thus, the user can visualize how the rider will look in a natural environment, such as a park or track near the rider's home where they actually will be riding the bicycle. Such an augmented reality visualization may be provided with any background, such as in the user's living room, school hallway, etc. In some embodiments the background may be a virtual background, such as the streets of the Tour de France route, so that the user can view the rider as they might look riding the bicycle on the Tour de France. Any of the representations of an avatar and bicycle discussed herein may be replaced with a augmented reality view such as is shown in FIG. 5, or reduced size augmented reality view.

Figure 6:
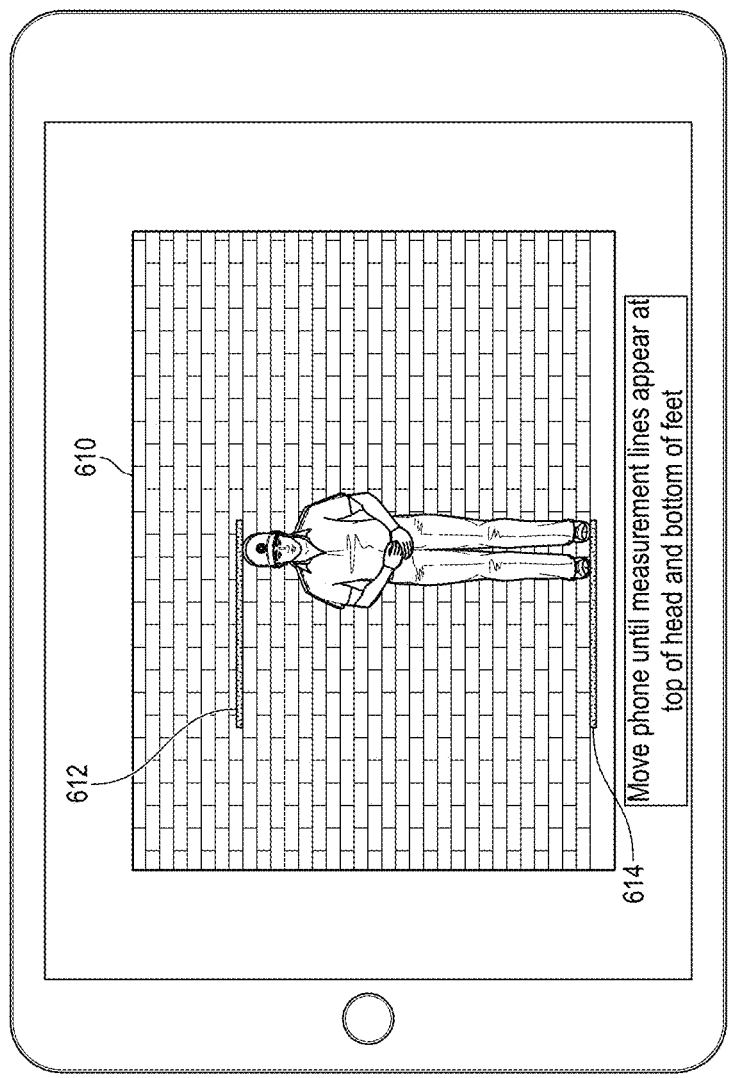
FIG. 6 illustrates a camera output that is usable by the sizing software in some embodiments to obtain a height of the rider.

FIG. 6 illustrates a camera output 610 that is usable by the sizing software in some embodiments to obtain a height of the rider. In this example, the user is provided instructions to move the phone until measurement lines appear at top of head and bottom of the rider. Thus, the user may move the phone up and down until the software automatically detects and indicates locations 612 and 614 above and below the rider. In some embodiments, the user can manually adjust the location 612 and/or 614 to provide the appropriate locations above and below the rider. In some embodiments, the smart phone also determines a distance to the user, such as using measurement software available for mobile devices (e.g., Google's ARCore or Apple's ARKit). With the distance to the rider and an image of the height of the rider at that distance, the system may calculate the actual height of the rider. In some embodiments, the user is asked to position another indicator at other measurement points on the user, such as inseam. In another embodiment, the user may provide a picture or video the (from a smart device or computer) with a rider holding an object with a known size, such as a ruler, notebook, quarter, etc. Body dimensions of the writer may then be calculated by comparison to the known size of the object. Thus, the sizing software may provide functionality that improves the technology of determining body dimensions of a rider and may provide more accurate matching of a bicycle using those automatically determine body dimensions.

Figure 7A:
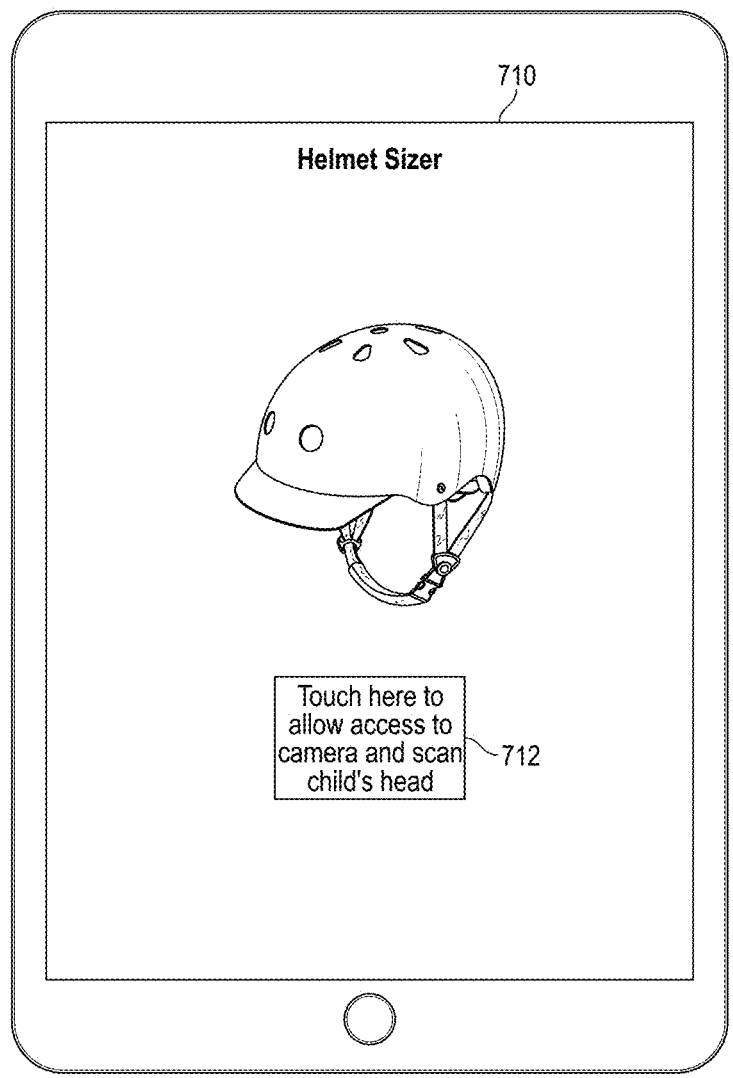
FIGS. 7A, 7B, and 7C illustrates example user interfaces that may be provided as part of a sizing software application to automatically estimate helmet size for a rider.
Figure 7B:
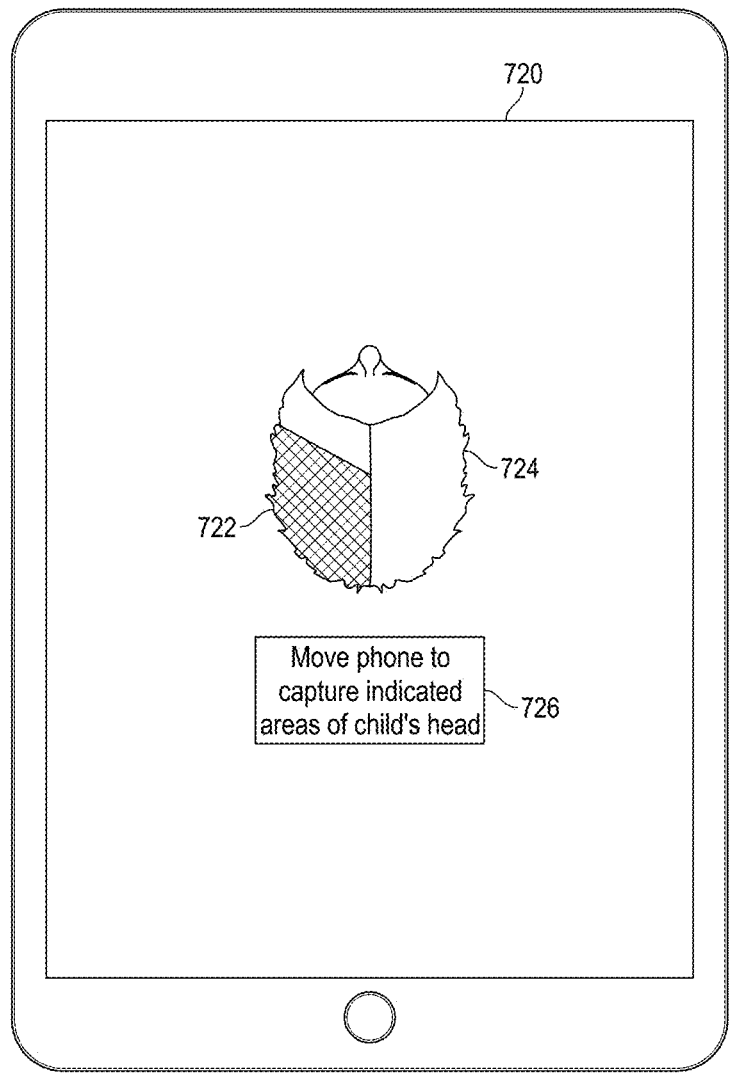
Figure 7C:
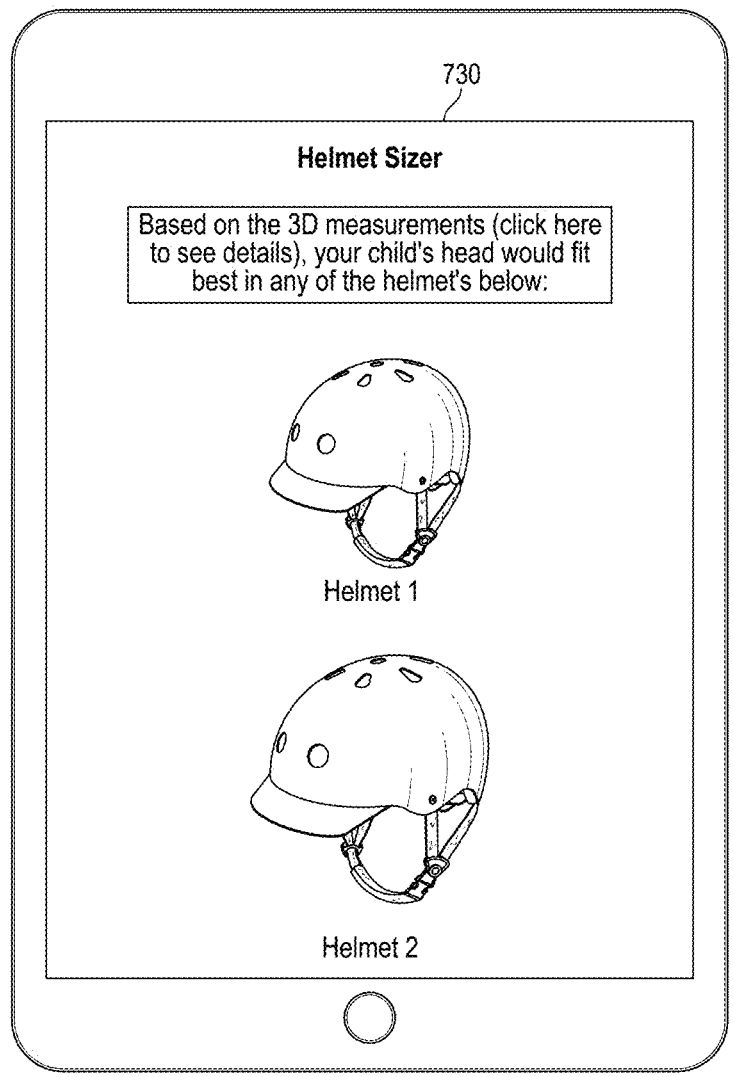

FIG. 7 (including FIGS. 7A, 7B, and 7C) illustrates example user interfaces that may be provided as part of a sizing software application to automatically estimate helmet size for a rider. Similar to the discussion above with reference to obtaining measurements of a rider for sizing of an appropriate bicycle size, FIG. 7 illustrates implementation of software on a smart device that obtains 3-D measurement data of a rider and then uses that 3-D measurement data to select a best fitting helmet. Starting with FIG. 7A, the user interface 710 asks the user to provide access to the device's camera by selecting button 712. The user interface 710 may be accessible from any of the other user interfaces discussed herein, such as from the user-interface 2A, 3A, 3C, 3D, etc.

Next, when the user allows access to the camera of the device, user interface 720 (FIG. 7B) may be displayed. In this example embodiment, the sizing software includes a 3-D scanning module that obtains images of an object and generates dimensions and/or representation of the scanned object. In user interface 720, a photo portion 722 illustrates a portion of the rider's head that has not yet been digitized, while digitized portion 724 illustrates an overlay of a digital representation of the rider's head that has adequately been 3-D scanned by the 3-D scanning module. As shown in the prompt 726, the user is asked to move the phone to capture the indicated areas (e.g., photo portion 722) of the rider's head.

Once the rider's head has adequately been scanned, the 3-D measurement data may be used in selecting an appropriate helmet for the rider. For example, measurements of the rider's head may include various dimensions, such as length, width, roundness, protrusions, etc. that may be matched against similar sizing characteristics of available helmets. In some embodiments, virtual representations of helmets may be placed over the digitized head of the rider to test the fit of the helmet. In some embodiments, the sizing software may automatically measure gaps between sides, top, front and/or back of the user's virtual head when the virtual helmet is placed on the virtual head of the rider. In some embodiments, the sizing software may perform such a size selection process on multiple helmets, possibly from multiple manufacturers, to identify a helmet (or helmets) that minimize gaps between the user's head and the helmet. In this way, multiple helmets may be rapidly sized against the rider's actual head dimensions to provide an accurate and comfortable fit. The user interface 730 (FIG. 7C) illustrates two helmets that have been matched to the head dimensions of the rider scanned in user interface 720. The user is provided with an opportunity to select one of the helmets and to then choose options for the helmets, such as color, strap design, etc. In some embodiments, the avatar of the rider is shown in the helmet. The user interface may also provide important for characteristics related to safety and/or comfort of particular helmets, as well as why a particular helmet is safe for the particular rider. For example, in some embodiments a fit rating or score is provided for each of one or more helmets, which may indicate how the particular helmet ranks overall in factors such as safety and comfort.

Figure 8:
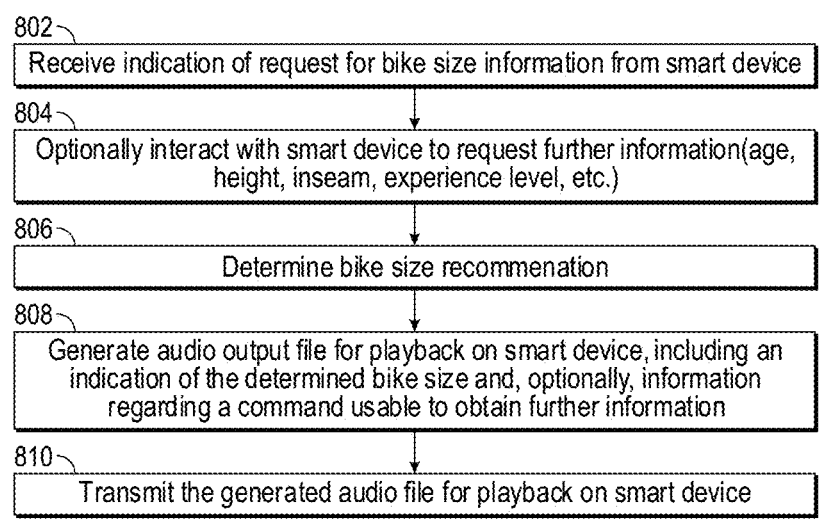
FIG. 8 is a flowchart illustrating one embodiment of a method that may be performed by a software sizing system to provide audible bicycle recommendations to a user.

FIG. 8 is a flowchart illustrating one embodiment of a method that may be performed by a software sizing system to provide audible bicycle recommendations to a user. In the embodiment of FIG. 8, a smart device, such as Apple's Siri, Amazon's Alexa, Google's Voice Assistant, Microsoft's Cortana, Samsung's Bixby, or the like, may be provided with a sizing program (e.g., an application, custom action, recipe, etc.) that detects a particular voice input indicating that a bicycle sizing routine should be executed. The voice input may vary based on the implementation, but could be something like "Hey computer, find the right size bicycle" or "what bike should I get for a 42 inch girl?" In response to such a voice input, the method of FIG. 8 may be performed. Depending on the embodiment, the method of FIG. 8 may include fewer or additional blocks and the blocks may be performed in an order that is different than illustrated.

Beginning at block 802, the system receives a request for bicycle sizing, such as indicated above. In some embodiments, the request is provided via physical input, such as pressing a particular series of buttons on the device, rather than, or in addition to, a voice command.

Next, at block 804, the system optionally interacts with the user to obtain information regarding the rider that is to be sized for a bicycle and/or helmet. For example, the system may request information such as age, height, inseam, and/or experience level of the rider. The user may provide the requested information via oral voice commands, which are recognized using voice recognition of the smart device.

Moving to block 806, the sizing software executes a rider dimensions model to determine any additional body dimensions of the rider for selecting a bike size. For example, if the user provided only an age of the rider, the rider dimensions model may calculate the expected height and inseam of the rider based on that age. In some embodiments, the smart device may communicate with the user's smart phone to obtain optical input information from the smartphone, such as the measurement data discussed above. The software may then use a bike selection model to determine one or more bikes that are suitable for the rider, such as based on the determined or calculated dimensions.

Next, at block 808, information regarding the selected bike (or bikes) may be provided via audible output (810) from the smart device. For example, bicycle size, brand, colors available, etc. may be audibly spoken by the smart device. In some embodiments, the smart device may indicate a command that initiates ordering of the indicated bike and/or directs the user to additional information regarding the indicated bike. In some embodiments, a command may be spoken by the user to initiate population of an application on the user's smart phone with information regarding the identified bicycle, such as information discussed herein with reference to FIGS. 2 and 3. For example, an application on the user's smart phone (e.g., Amazon's Alexa iPhone application) may receive a push notification from the users smart device (e.g., Amazon's Alexa that the user has been interacting with) to cause a notification to appear on the user smart device with a link to information about the identified bicycle. The bicycle may then be reviewed and/or ordered via the smart phone of the user or a further voice command may be provided to the smart device to initiate ordering of the bicycle. In some embodiments, the sizing software executing on the smart device may ask for permission (or listen for a predetermined command) to send sizing information to the user, such as via email or text message. In such an embodiment, the smart device may use an email address or phone number associated with the smart device or the user may provide an alternate email address or phone number. The sizing software may then transmit various sizing reports, growth reports, growth animations, etc. to the user.

Figure 9A:
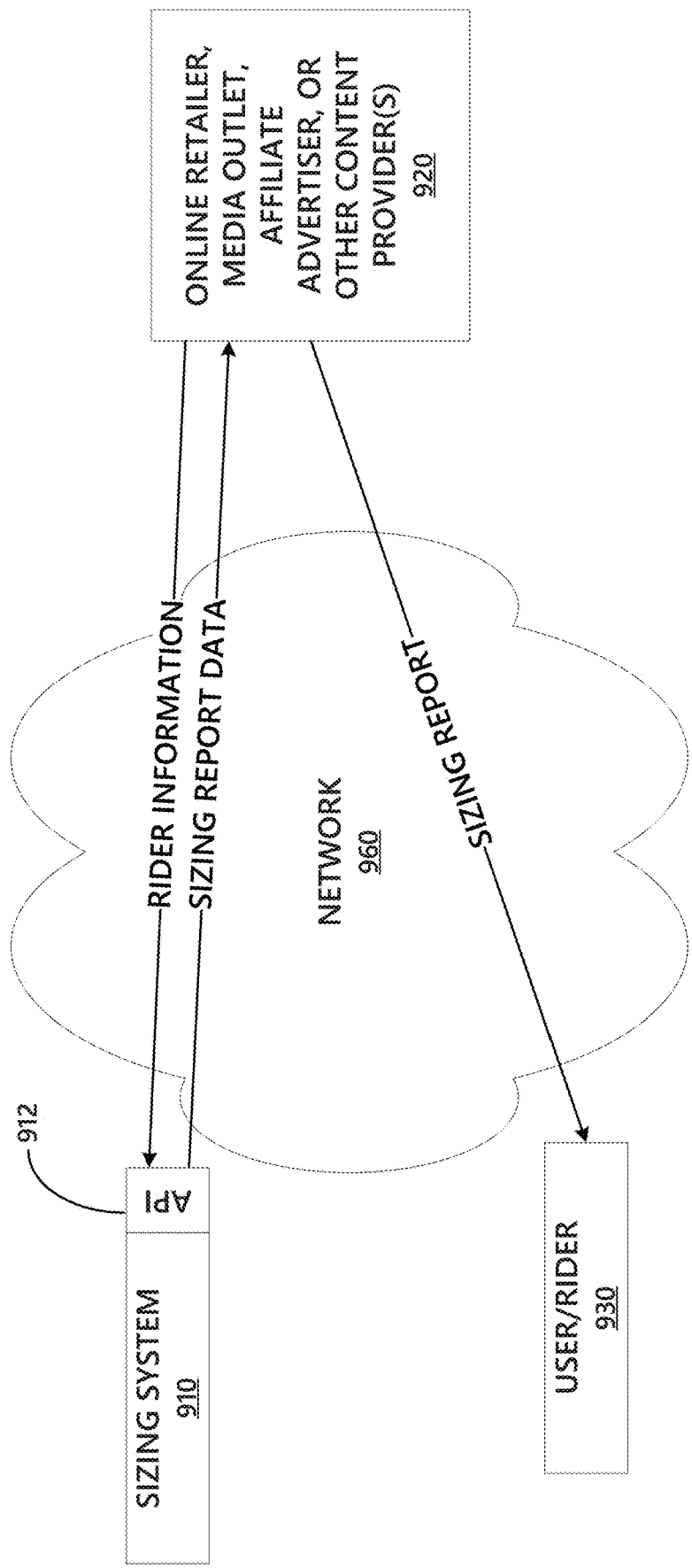
FIG. 9A is a flow diagram illustrating an example implementation of sizing software in conjunction with a third-party system.

FIG. 9A is a flow diagram illustrating an example implementation of sizing software in conjunction with a third-party system. In the example of FIG. 9A, a third-party entity 920, such as an online retailer, media outlet, affiliate advertiser, or other online content provider, has entered into an arrangement with the provider of the sizing software to provide the sizing functionality in conjunction with online content of the third-party entity. For example, in one embodiment the third-party entity 920 may include a request for rider information in its website, and then transmit the rider information to the sizing system 910 to apply rider dimension models, sizing models, and/or bike selection models in order to determine further rider body dimensions and to determine a best fit bicycle for the rider, bike life for that selected bicycle, and/or any other information discussed above that may be provided to the user and/or rider.

In some embodiments, the third-party entity 920 is provided with an embeddable object, such as an iframe, that may be placed on the website of the third-party entity 920 to communicate with the sizing system 910 directly in obtaining the rider information needed to identify a best fit bicycle and/or estimations of bike life and future bicycle sizes.

In some embodiments, the third-party entity 920 interacts with the sizing system 910 via an API 912 that allows secure and direct communication between the devices. For example, the sizing system 910 may issue an API token to the third-party entity 920 that uniquely identifies request for sizing information are received from that third-party entity 920. Thus, the sizing system 910 may also track usage of the sizing software by the particular third-party entity, such as for billing purposes. For example, the third-party entity 920 may be required to pay a per use fee for requesting sizing information from the sizing system 910.

In the embodiment of FIG. 9A, the sizing report data provided to the third-party entity 920 may be the actual sizing report that is provided to the user 930, such as user interface data that may be transmitted to and rendered on the user device 930. Alternatively, the sizing report data may be the raw rider data (e.g., estimated rider inseam, estimated growth, best fit size, etc.), which may then be used by the third-party entity 922 to generate a custom user interface to display the selected information to the user 930. For example, the third party may use the best fit size to search its own database of bikes available for purchase.

Figure 9B:
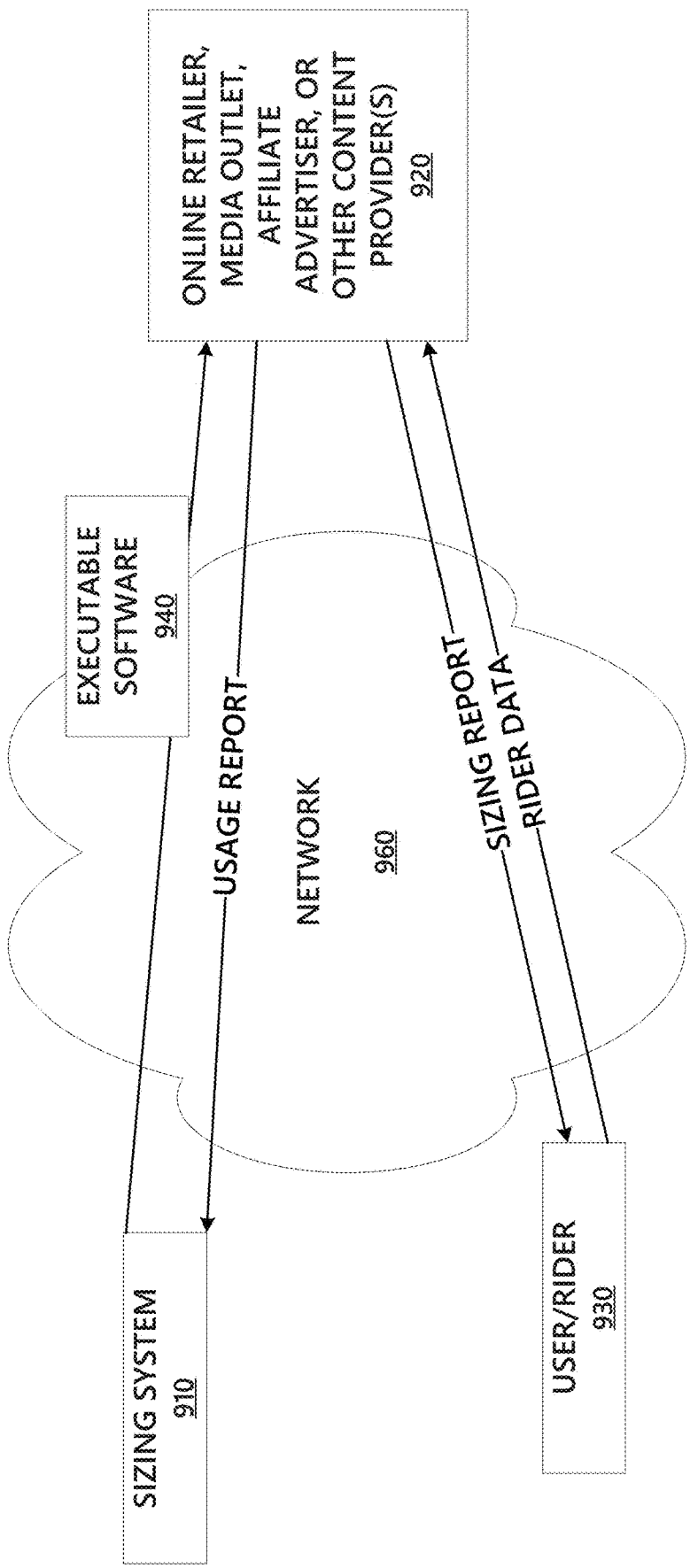
FIG. 9B is an example flow diagram illustrating distribution of executable software from the sizing system to the third-party entity.

FIG. 9B is an example flow diagram illustrating distribution of executable software 940 from the sizing system 910 to the third-party entity 920. In this example, the executable software may include the rider dimensions models, sizing models, and/or bike selection models, that are executable by the third-party entity 920 to interact with the user 930 to provide any of the user interfaces and reports discussed above with reference to the sizing system. For example, a third-party entity 920 may operate the executable software 940 independent of the sizing system 910. In some embodiments, the third-party entity 920 is required to provide usage data to the sizing system 910, such as weekly or monthly, to indicate how the sizing software has been used by the third-party entity 920 and to, in some embodiments, trigger calculation of a licensing fee payable by the third-party entity 920, such as based on number of bike recommendations provided or number of rider's data analyzed.

Example Computing System Components

Figure 10:
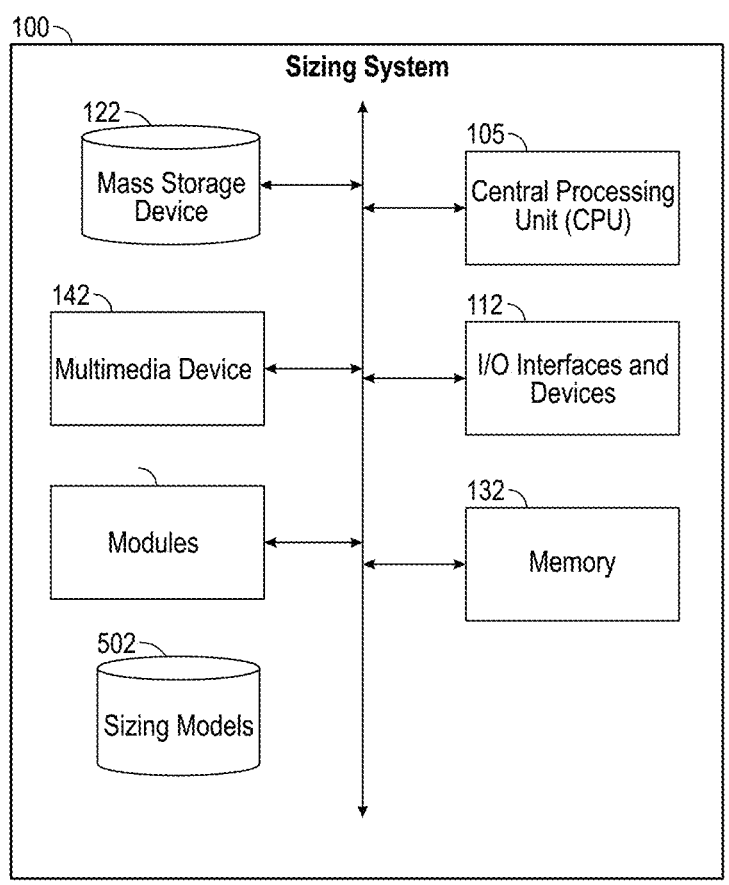
FIG. 10 is an example block diagram illustrating example components that may be included in the sizing system.

FIG. 10 is an example block diagram illustrating example components that may be included in the sizing system 100, which may include, for example, a personal computer that is IBM, Macintosh, or Linux/Unix compatible or a server or workstation. In one embodiment, the computing system 100 comprises a server, a laptop computer, a smart phone, a personal digital assistant, a kiosk, or a media player, for example. In one embodiment, the exemplary computing system 100 includes one or more central processing unit ("CPU") 105, which may each include a conventional or proprietary microprocessor. The computing system 100 further includes one or more memory 132, such as random access memory ("RAM") for temporary storage of information, one or more read only memory ("ROM") for permanent storage of information, and one or more mass storage device 122, such as a hard drive, diskette, solid state drive, or optical media storage device. Typically, the components of the computing system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 100 may be combined into fewer components and modules or further separated into additional components and modules.

The computing system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 100 may include one or more commonly available input/output (I/O) devices and interfaces 112, such as a keyboard, mouse, touchpad, and printer. In one embodiment, the I/O devices and interfaces 112 include one or more display devices, such as a monitor, that allows the visual presentation of data to a user. More particularly, a display device provides for the presentation of GUIs, application software data, and multimedia presentations, for example. The computing system 100 may also include one or more multimedia devices 142, such as speakers, video cards, graphics accelerators, and microphones, for example.

In the embodiment of FIG. 10, the I/O devices and interfaces 112 provide a communication interface to various external devices. In the embodiment of FIG. 1, the computing system 100 is electronically coupled to one or more networks 160, which comprise one or more of a LAN, WAN, and/or the Internet, for example, via a wired, wireless, or combination of wired and wireless, communication link. The networks communicate with various computing devices and/or other electronic devices via wired or wireless communication links, such as the credit Bureau data source and financial information data sources.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Notification Module

In some embodiments, alerts or notifications (e.g., of a change in recommend bike for a child or offer for a next bike for the child) may be automatically transmitted to the device operated by the entity associated with the alert and/or notification (e.g., a parent). The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Artificial Intelligence/Machine Learning Language

Training of models, including user dimensions models and sizing models, using body dimensions data of a plurality of users, prior recommendations, outcomes of those recommendations, and the like, may be performed partially or entirely by machine learning techniques. Machine learning is a subset of artificial intelligence that iteratively learns from data without being explicitly programmed. Thus, a computing device configured to use machine learning techniques to perform an action can learn how to perform the action without being explicitly programmed. Accordingly, the machine learning techniques improve the functionality of the computing device itself because the machine learning techniques allow the computing device to learn, and thereby produce more accurate expected body dimensions and recommendations, without being explicitly programmed.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code ridden in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
 a non-transitory computer readable medium storing software instructions; and
 one or more computer processors configured to access the software instructions to cause the computing system to:
 generate interactive user interface data configured for rendering on a user computing device to display an interactive user interface requesting characteristics of a child;
 receive, from the user computing device via the interactive user interface, characteristics of the child including at least a height of the child;
 execute a rider dimension model to:
 determine, based on the height of the child, an expected inseam of the child, the expected inseam determined based on a ratio of height to inseam;
 determine an avatar of the child sized proportionally to the height and the expected inseam;
 execute a selection model, based at least on the expected inseam, to determine a bicycle size most suitable for the child;
 select a representation of a bicycle having the determined bicycle size; and update the interactive user interface to include the representation of the bicycle and the avatar of the child positioned sitting on a seat of the bicycle;
determine a current age of the child;
for each of a plurality of future ages of the child:
  determine a growth rate of the child, based on the future age, wherein children of different ages have different growth rates;
  determine, based on the growth rate of the child, an expected inseam at the future age;
  determine, based on the expected inseam at the future age, a future bicycle size most suitable for the child;
  determine whether the future bicycle size is different than the bicycle size; and
  if the future bicycle size is different than the bicycle size by a predetermined amount, determine a bike life as a difference between the future age and the current age of the child, wherein the predetermined amount allows the determined bike life to extend into a time period where the future bicycle size would fit the child but the current size would still fit the child comfortably.

2. The computing system of claim 1, wherein the expected inseam of the child is further based on an age of the child.

3. The computing system of claim 1, wherein the avatar is a two dimensional or three dimensions representation of the child.

4. The computing system of claim 1, wherein the representation of the bicycle is a two dimensional or three dimensions representation of the bicycle.

5. The computing system of claim 1, wherein an output of the selection model indicates a bike life estimation indicating a period of time for which the child fits the bicycle.

6. The computing system of claim 1, further comprising:
if the future bicycle size is different than the bicycle size, determine the bike life as a difference between the future age and the current age of the child.

7. The computing system of claim 1, wherein the current age of the child is automatically determined based on the height of the child.

8. The computing system of claim 1, further comprising:
animating the representation of the bicycle to indicate the avatar pedaling the bicycle.

9. The computing system of claim 1, wherein the three dimensional representation of the bicycle and the avatar are rotatable in at least two dimensions, via input from the interactive user interface.

10. The computing system of claim 1, further comprising:
generating an electronic or printed sizing report indicating, for each of the plurality of future ages of the child, one or more of:
the future age;
an expected height at the future age;
an expected inseam at the future age;
a future bicycle suitable for the child at the future age;
a bike life of the bicycle; and
a new bicycle size for the future age.

11. A computing system comprising:
a non-transitory computer readable medium storing software instructions; and
one or more computer processors configured to access the software instructions to cause the computing system to:
generate interactive user interface data configured for rendering on a user computing device to display an interactive user interface requesting characteristics of a child;
receive, from the user computing device via the interactive user interface, characteristics of the child including at least a height of the child;
execute a rider dimension model to:
  determine, based on the height of the child, an expected inseam of the child, the expected inseam determined based on a ratio of height to inseam;
  determine an avatar of the child sized proportionally to the height and the expected inseam;
execute a selection model, based at least on the expected inseam, to determine a bicycle size most suitable for the child;
select a representation of a bicycle having the determined bicycle size; and
update the interactive user interface to include the representation of the bicycle and the avatar of the child positioned sitting on a seat of the bicycle;
determine a future age of the child; and
based on the determined future age, in realtime:
  determine the expected inseam of the child at the future age;
  select an updated avatar to represent the child at the future age; and
  use the updated avatar in place of the avatar on the representation of the bicycle.

12. The computing system of claim 11, wherein the user interface includes a slider user interface control that allows adjustment of the future age of the child.

13. A computing system comprising:
a non-transitory computer readable medium storing software instructions; and
one or more computer processors configured to access the software instructions to cause the computing system to:
generate interactive user interface data configured for rendering on a user computing device to display an interactive user interface requesting characteristics of a child;
receive, from the user computing device via the interactive user interface, a body dimension of the child, wherein the body dimension is an inseam of the child:
execute a rider dimension model to determine an avatar of the child sized proportionally to the body dimension of the child;
execute a selection model, based at least on the body dimension of the child, to determine a bicycle size most suitable for the child;
select a representation of a bicycle having the determined size; and
update the interactive user interface to include the representation of the bicycle and the avatar of the child positioned sitting on a seat of the bicycle;
determine a future age of the child;
determine an adjusted body dimension of the child at the determined future age;
determine, based at least on the adjusted body dimension, an updated avatar to represent the child at the future age; and
update the interactive user interface to include the updated avatar on the representation of the bicycle.

* * * * *